(12) United States Patent
Lee et al.

(10) Patent No.: US 10,542,859 B2
(45) Date of Patent: Jan. 28, 2020

(54) CLEANING ROBOT AND CONTROLLING METHOD THEREOF

(71) Applicant: Samsung Electronics Co., Ltd., Suwon-si, Gyeonggi-do (KR)

(72) Inventors: Dong Hyun Lee, Suwon-si (KR); In Joo Kim, Suwon-si (KR); Dong Min Shin, Suwon-si (KR); Jeong Ki Yoo, Suwon-si (KR); Dong Hun Lee, Ansan-si (KR); Ji Won Chun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 15/548,008

(22) PCT Filed: Feb. 12, 2016

(86) PCT No.: PCT/KR2016/001434
§ 371 (c)(1),
(2) Date: Aug. 1, 2017

(87) PCT Pub. No.: WO2016/129950
PCT Pub. Date: Aug. 18, 2016

(65) Prior Publication Data
US 2018/0020893 A1    Jan. 25, 2018

(30) Foreign Application Priority Data

Feb. 13, 2015    (KR) .......................... 10-2015-0022736

(51) Int. Cl.
*A47L 9/28*      (2006.01)
*A47L 5/22*      (2006.01)
(Continued)

(52) U.S. Cl.
CPC ............... *A47L 9/2852* (2013.01); *A47L 5/22* (2013.01); *A47L 9/009* (2013.01); *A47L 9/0411* (2013.01);
(Continued)

(58) Field of Classification Search
CPC ............. A47L 2201/04; A47L 11/4011; A47L 11/4061; A47L 9/2852; A47L 2201/06;
(Continued)

(56) References Cited

U.S. PATENT DOCUMENTS

2005/0171644 A1*  8/2005  Tani .................... A47L 9/009
                                                           700/253
2005/0273967 A1* 12/2005  Taylor .................. A47L 5/28
                                                            15/319

(Continued)

FOREIGN PATENT DOCUMENTS

EP    2 677 386 A1    12/2013
EP    2 781 981 A2     9/2014
(Continued)

OTHER PUBLICATIONS

Chinese Office Action dated Aug. 12, 2019, issued in a counterpart Chinese application No. 201680013581.X.

*Primary Examiner* — Todd M Melton
*Assistant Examiner* — Jason R Roberson
(74) *Attorney, Agent, or Firm* — Jefferson IP Law, LLP

(57) ABSTRACT

Disclosed is a cleaning robot for creating a 3Dimensional (3D) obstacle map including information about a height of an object existing on an area to be cleaned, and cleaning the area to be cleaned based on the 3D obstacle map, and a method of controlling the cleaning robot. In accordance with an aspect of the present disclosure, there is provided. The cleaning robot includes a main body, a moving portion configured to move the main body, an obstacle sensor
(Continued)

configured to sense a height of an obstacle, and a controller configured to create an obstacle map including information about the height of the obstacle.

19 Claims, 18 Drawing Sheets

(51) Int. Cl.
| | | |
|---|---|---|
| *A47L 9/00* | (2006.01) | |
| *A47L 9/04* | (2006.01) | |
| *B25J 9/00* | (2006.01) | |
| *B25J 19/04* | (2006.01) | |
| *G05D 1/02* | (2006.01) | |
| *G06K 9/00* | (2006.01) | |
| *H04N 5/225* | (2006.01) | |

(52) U.S. Cl.
CPC ............ *A47L 9/0477* (2013.01); *A47L 9/2826* (2013.01); *A47L 9/2857* (2013.01); *B25J 9/0003* (2013.01); *B25J 19/04* (2013.01); *G05D 1/0214* (2013.01); *G05D 1/0248* (2013.01); *G05D 1/0274* (2013.01); *G06K 9/00664* (2013.01); *G06K 9/00805* (2013.01); *H04N 5/2251* (2013.01); *A47L 2201/04* (2013.01); *G05D 2201/0203* (2013.01); *G05D 2201/0215* (2013.01); *Y10S 901/01* (2013.01); *Y10S 901/47* (2013.01)

(58) Field of Classification Search
CPC ............ A47L 9/2805; A47L 2201/022; A47L 9/2857; A47L 11/282; A47L 11/283; A47L 11/4038; A47L 11/4066; A47L 11/4069; A47L 9/009; A47L 9/28; A47L 11/4005; A47L 11/4013; A47L 11/4041; A47L 11/4083; A47L 9/2826; A47L 9/2842; A47L 9/2847; G05D 2201/0203; G05D 1/0238; G05D 1/0274; G05D 1/0242; G05D 1/0246; G05D 1/0248; G05D 1/0255; G05D 2201/0215; G05D 1/0016; G05D 1/0033; G05D 1/0088; G05D 1/0217; G05D 1/0219; G05D 1/0223; G05D 1/0227; G05D 1/0231; G05D 1/024; G05D 1/0257; G05D 1/0259; G05D 1/0272; Y10S 901/01; Y02B 40/82

USPC ............ 701/26, 28; 700/245, 253, 255, 259; 15/319; 173/1
See application file for complete search history.

(56) References Cited

U.S. PATENT DOCUMENTS

| | | | | |
|---|---|---|---|---|
| 2013/0338831 | A1* | 12/2013 | Noh | B25J 9/1676 700/259 |
| 2014/0283326 | A1* | 9/2014 | Song | A47L 11/4041 15/319 |
| 2014/0350839 | A1 | 11/2014 | Pack et al. | |
| 2014/0371909 | A1* | 12/2014 | Lee | G05D 1/0016 700/259 |
| 2015/0032259 | A1* | 1/2015 | Kim | A47L 9/2805 700/255 |
| 2015/0142169 | A1* | 5/2015 | Kim | A47L 11/282 700/245 |
| 2015/0150429 | A1* | 6/2015 | Yoo | A47L 11/4011 173/1 |
| 2015/0157182 | A1* | 6/2015 | Noh | G05D 1/0231 701/28 |
| 2015/0265125 | A1* | 9/2015 | Lee | A47L 11/4061 701/26 |
| 2016/0274580 | A1* | 9/2016 | Jung | G05D 1/0022 |
| 2016/0306359 | A1* | 10/2016 | Lindhe | G05D 1/0221 |
| 2016/0316982 | A1* | 11/2016 | Kim | A47L 9/2857 |
| 2017/0035263 | A1* | 2/2017 | Kim | A47L 11/282 |
| 2017/0156560 | A1* | 6/2017 | Jung | A47L 9/16 |
| 2017/0273527 | A1* | 9/2017 | Han | A47L 9/2805 |
| 2017/0325647 | A1* | 11/2017 | Kwak | A47L 9/009 |
| 2018/0028033 | A1* | 2/2018 | Jung | A47L 9/28 |
| 2018/0217611 | A1* | 8/2018 | Kim | A47L 9/28 |

FOREIGN PATENT DOCUMENTS

| | | |
|---|---|---|
| KR | 10-2010-0031878 A | 3/2010 |
| KR | 10-2010-0109257 A | 10/2010 |
| KR | 10-2011-0010380 A | 2/2011 |
| KR | 10-1181638 B1 | 9/2012 |
| KR | 10-2013-0141979 A | 12/2013 |
| KR | 10-2014-0109175 A | 9/2014 |
| WO | 2010/114235 A1 | 10/2010 |

* cited by examiner

FIG. 16
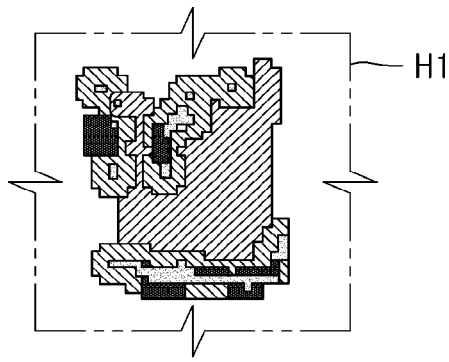
(a) OBSTACLE MAP OF FIRST AREA
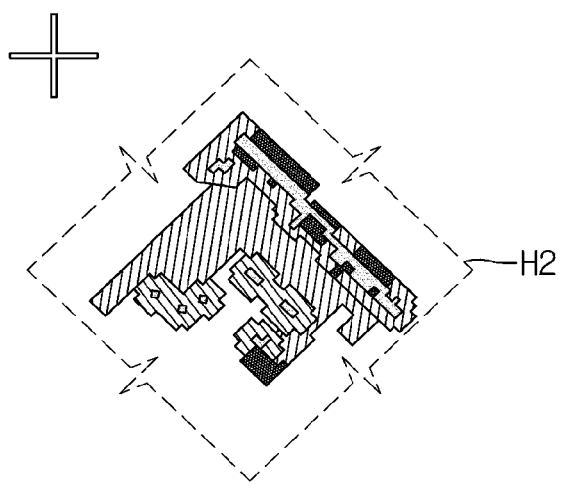
(b) OBSTACLE MAP OF COORDINATE-TRANSFORMED SECOND AREA
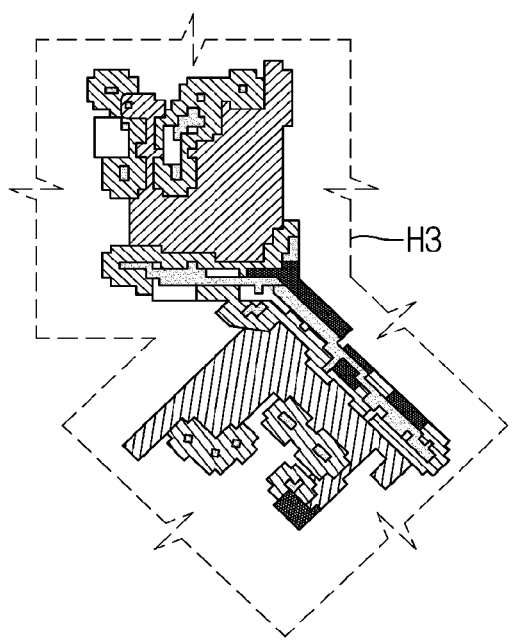
(c) MATCHED OBSTACLE MAP

CLEANING ROBOT AND CONTROLLING METHOD THEREOF

TECHNICAL FIELD

The present invention relates to a cleaning robot.

BACKGROUND ART

A cleaning robot is equipment to travel on a floor without a user's manipulation to suck foreign materials such as dust existing on the floor, thereby automatically cleaning the floor. That is, the cleaning robot travels on a floor to clean the floor.

The cleaning robot senses the locations of obstacles, and travels on an area to be cleaned to clean the area while avoiding the obstacles in order to perform cleaning in various surrounding environments. Accordingly, the cleaning robot needs to travel efficiently and accurately, in order to efficiently clean an area to be cleaned.

DISCLOSURE

Technical Problem

An aspect of the present disclosure is to provide a cleaning robot of creating a 3Dimensional (3D) obstacle map including information about a height of an object existing on an area to be cleaned, and cleaning the area to be cleaned based on the 3D obstacle map, and a method of controlling the cleaning robot.

Another aspect of the present disclosure is to provide a cleaning robot of matching, when it moves to another area by an external force during cleaning, a feature point map of an area where the cleaning robot is located before moving with a feature point map of another area where the cleaning robot is located after moving, and performing cleaning based on the matched feature point map, and a method of controlling the cleaning robot.

Technical Solution

In accordance with an aspect of the present disclosure, there is provided A cleaning robot including: a main body; a moving portion configured to move the main body; an obstacle sensor configured to sense a height of an obstacle; and a controller configured to create an obstacle map including information about the height of the obstacle.

The controller determines whether the height of the obstacle existing on the obstacle map is higher than or equal to a predetermined height, and controls the moving portion so that the main body avoids the obstacle, if the controller determines that the height of the obstacle is higher than or equal to the predetermined height.

If the controller determines that the height of the obstacle is lower than the predetermined height, the controller controls the moving portion so that the main body climbs over the obstacle.

The obstacle map includes a 2Dimensional (2D) obstacle map or the information about the height of the obstacle, and the obstacle map includes shape information or type information of the obstacle.

The obstacle sensor is configured to irradiate light downward at a predetermined angle with respect to a front direction.

The obstacle sensor is tilted downward at a predetermined angle with respect to a front direction.

The obstacle sensor includes: an optical module configured to transmit and receive light; and a rotary driver configured to rotate the optical module.

The optical module includes: a light emitting portion configured to transmit light; and a light receiving portion configured to receive light incident from the outside of the cleaning robot.

The light emitting portion includes a laser source, and the light receiving portion includes an image sensor.

The cleaning robot further includes a camera mounted on an upper portion of the main body, and configured to acquire an upper view image of the cleaning robot, wherein the controller extracts a feature point from the upper view image acquired by the camera to create a feature point map.

If the main body moves from a first area to a second area by an external force, the controller matches a feature point map of the first area with a feature point map of the second area.

If the main body moves from a first area to a second area by an external force, the controller matches an obstacle map of the first area with an obstacle map of the second area.

The controller detects a feature point included in the feature point map of the first area from the feature point map of the second area, and matches the feature point map of the first area with the feature point map of the second area using the detected feature point.

The controller performs coordinate transformation on the feature point map of the second area such that coordinates of the detected feature point are identical to coordinates of the corresponding feature point in the feature point map of the first area, to thereby match the feature point map of the second area with the feature point map of the first area.

The controller performs coordinate transformation on an obstacle map of the second area to match the obstacle map of the second area with an obstacle map of the first area.

In accordance with an aspect of the present disclosure, there is provided a cleaning robot including: a main body; a camera mounted on an upper portion of the main body, and configured to acquire an upper view image of the cleaning robot; and a controller configured to extract a feature point from the upper view image acquired by the camera to create a feature point map, wherein if the main body moves from a first area to a second area, the controller matches a feature point map of the first area with a feature point map of the second area.

If the main body moves from the first area to the second area by an external force, the controller stores the feature point map of the first area and creates the feature point map of the second area.

The controller detects a feature point included in the feature point map of the first area from the feature point map of the second area, and matches the feature point map of the second area with the feature point map of the first area using the detected feature point.

The controller performs coordinate transformation on the feature point map of the second area such that coordinates of the detected feature point are identical to coordinates of the corresponding feature point of the feature point map of the first area, to thereby match the feature point map of the second area with the feature point map of the first area.

The cleaning robot further includes an obstacle sensor configured to sense a height of an obstacle, wherein the controller creates an obstacle map including information about the height of the obstacle.

The obstacle map includes a 2Dimensional (2D) obstacle map or a 3Dimensional (3D) obstacle map including the information about the height of the obstacle, and the obstacle map includes information about a shape or a type of the obstacle.

If the height of the obstacle existing on the obstacle map is higher than or equal to a predetermined height, the controller moves the main body so that the main body avoids the obstacle.

If the height of the obstacle existing on the obstacle map is lower than a predetermined height, the controller moves the main body so that the main body climbs over the obstacle.

The obstacle sensor is configured to irradiate light downward at a predetermined angle with respect to a front direction.

The obstacle sensor is tilted downward at a predetermined angle with respect to a front direction.

The obstacle sensor includes: an optical module configured to transmit and receive light; and a rotary driver configured to rotate the optical module.

The optical module includes: a light emitting portion configured to transmit light; and a light receiving portion configured to receive light incident from the outside of the cleaning robot.

The light emitting portion includes a laser source, and the light receiving portion includes an image sensor.

In accordance with an aspect of the present disclosure, there is provided a cleaning robot including: a main body; and a cleaning portion configured to perform cleaning; wherein if the main body moves from a first area to a second area during cleaning, the cleaning portion performs cleaning in the second area, and if the main body enters the first area, the cleaning portion cleans the remaining space of the first area except for space cleaned in the first area.

If the main body enters the first area, the cleaning portion resumes cleaning of the first area.

In accordance with an aspect of the present disclosure, there is provided a cleaning robot including: a main body; an obstacle sensor mounted on the main body, and configured to sense a height of an obstacle; and a moving portion configured to move the main body, wherein if the height of the obstacle sensed by the obstacle sensor is higher than or equal to a predetermined height, the moving portion moves the main body such that the main body avoids the obstacle.

If the height of the obstacle is lower than the predetermined height, the moving portion moves the main body such that the main body climbs over the obstacle.

In accordance with an aspect of the present disclosure, there is provided a method of controlling a cleaning robot, including: at an obstacle sensor of the cleaning robot, sensing a height of an obstacle; and at a controller of the cleaning robot, creating an obstacle map including information about the height of the obstacle.

The method further includes: at the controller, determining whether the height of the obstacle existing on the obstacle map is higher than or equal to a predetermined height; and at a moving portion of the cleaning robot, moving the cleaning robot such that the cleaning robot avoids the obstacle, if the height of the obstacle is higher than or equal to the predetermined height.

The method further includes, at the moving portion of the cleaning robot, moving the cleaning robot such that the cleaning robot climbs over the obstacle, if the height of the obstacle is lower than the predetermined height.

The method further includes, if the cleaning robot moves from a first area to a second area by an external force, matching a feature point map of the first area with a feature point map of the second area.

The matching of the feature point map of the first area with the feature point map of the second area includes: detecting a feature point included in the feature point map of the first area from the feature point map of the second area; and matching the feature point map of the first area with the feature point map of the second area using the detected feature point.

The matching of the feature point map of the first area with the feature point map of the second area using the detected feature point includes: performing coordinate transformation on the feature point map of the second area such that coordinates of the detected feature point are identical to coordinates of the corresponding feature point in the feature point map of the first area; and matching the feature point map of the second area on which the coordinate transformation has been performed with the feature point map of the first area.

The method further includes: performing coordinate transformation on an obstacle map of the second area; and matching the obstacle map of the second area on which the coordinate transformation has been performed, with an obstacle map of the first area.

The method further includes, if the cleaning robot enters the first area, cleaning the remaining space of the first area except for space cleaned in the first area using the matched feature point map.

In accordance with an aspect of the present disclosure, there is provided a method of controlling a cleaning robot, including: at a controller of the cleaning robot, creating a feature point map of a first area; at the controller, creating a feature point map of a second area, if the cleaning robot moves to the second area; and at the controller, matching the feature point map of the second area with the feature point map of the first area.

The method further includes storing the feature point map of the first area if the cleaning robot moves to the second area by an external force.

The matching of the feature point map of the second area with the feature point map of the first area includes: detecting a feature point included in the feature point map of the first area from the feature point map of the second area; and matching the feature point map of the first area with the feature point map of the second area using the detected feature point.

The matching of the feature point map of the first area with the feature point map of the second area using the detected feature point includes: performing coordinate transformation on the feature point map of the second area such that coordinates of the detected feature point are identical to coordinates of the corresponding feature point in the feature point map of the first area; and matching the feature point map of the second area on which the coordinate transformation has been performed, with the feature point map of the first area.

The method further includes, if the main body enters the first area, cleaning the remaining space of the first area except for space cleaned in the first area using the matched feature point map.

In accordance with an aspect of the present disclosure, there is provided the method according to claim 41, including: at an obstacle sensor of the cleaning robot, sensing a height of an obstacle existing in the first area; at the controller, creating an obstacle map of the first area, the obstacle map including information about the height of the obstacle existing in the first area; at the controller, sensing a height of an obstacle existing in the second area, if the cleaning robot moves to the second are by an external force;

and at the controller, creating an obstacle map of the second area, the obstacle map including the information about the height of the obstacle existing in the second area.

The method further includes: at the controller, determining whether a height of an obstacle existing on the obstacle maps of the first area and the second area is higher than or equal to a predetermined height; and at a moving portion of the cleaning robot, moving the cleaning robot such that the cleaning robot avoids the obstacle, if the height of the obstacle is higher than or equal to the predetermined height.

The method further includes, at the moving portion of the cleaning robot, moving the cleaning robot such that the cleaning robot climbs over the obstacle, if the height of the obstacle is lower than the predetermined height.

Advantageous Effects

According to the cleaning robot and the control method thereof according to the present embodiments, it is possible to create a traveling path suitable for a type of an obstacle using information about a height of the obstacle existing on a 3D obstacle map.

Also, when the cleaning robot moves to another area by an external force during cleaning and then again enters an area where the cleaning robot has been located before moving to the other area, the cleaning robot can directly clean the remaining space except for space already cleaned in the area where the cleaning robot has been located before moving, without again cleaning the space already cleaned.

BRIEF DESCRIPTION OF THE DRAWINGS

FIG. 16 is a view for describing an example of a method of merging obstacle maps of different areas in the cleaning robot according to an embodiment of the present disclosure.

BEST MODE

Figure 1:
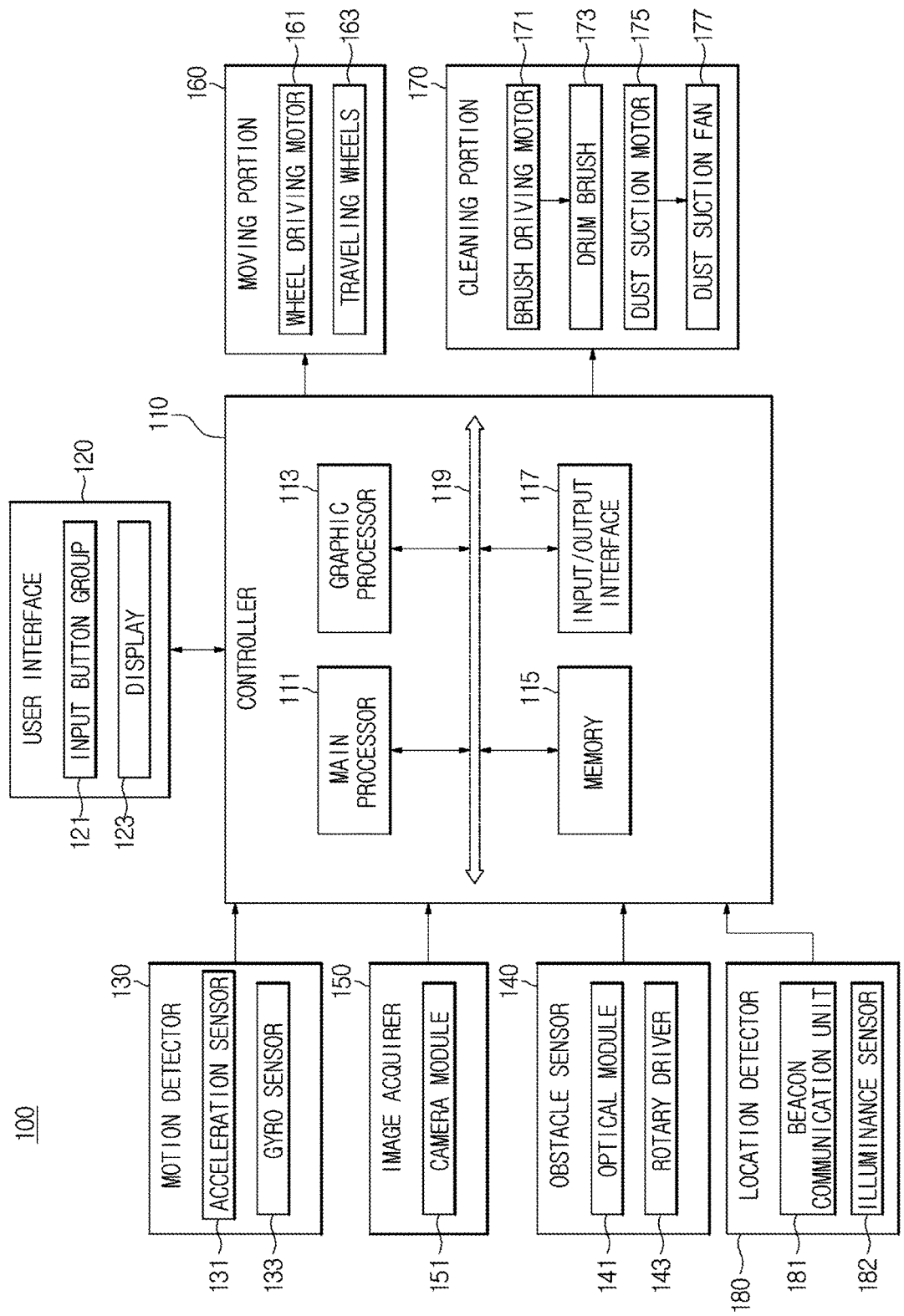
FIG. 1 shows a control configuration of a cleaning robot according to an embodiment of the present disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are used for describing the embodiments of the present disclosure, not for the purpose of limiting and/or restricting the invention. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Also, a touch operation may be generated by one of fingers including a thumb or by an input unit (for example, a stylus or the like) capable of touching. The touch operation may include a hovering event that occurs by one of fingers including a thumb or by an input unit capable of touching. Also, the touch operation may include a multi-touch operation as well as a single-touch operation.

Hereinafter, an embodiment of the present disclosure will be described in detail with reference to the accompanying drawings.

Figure 2:
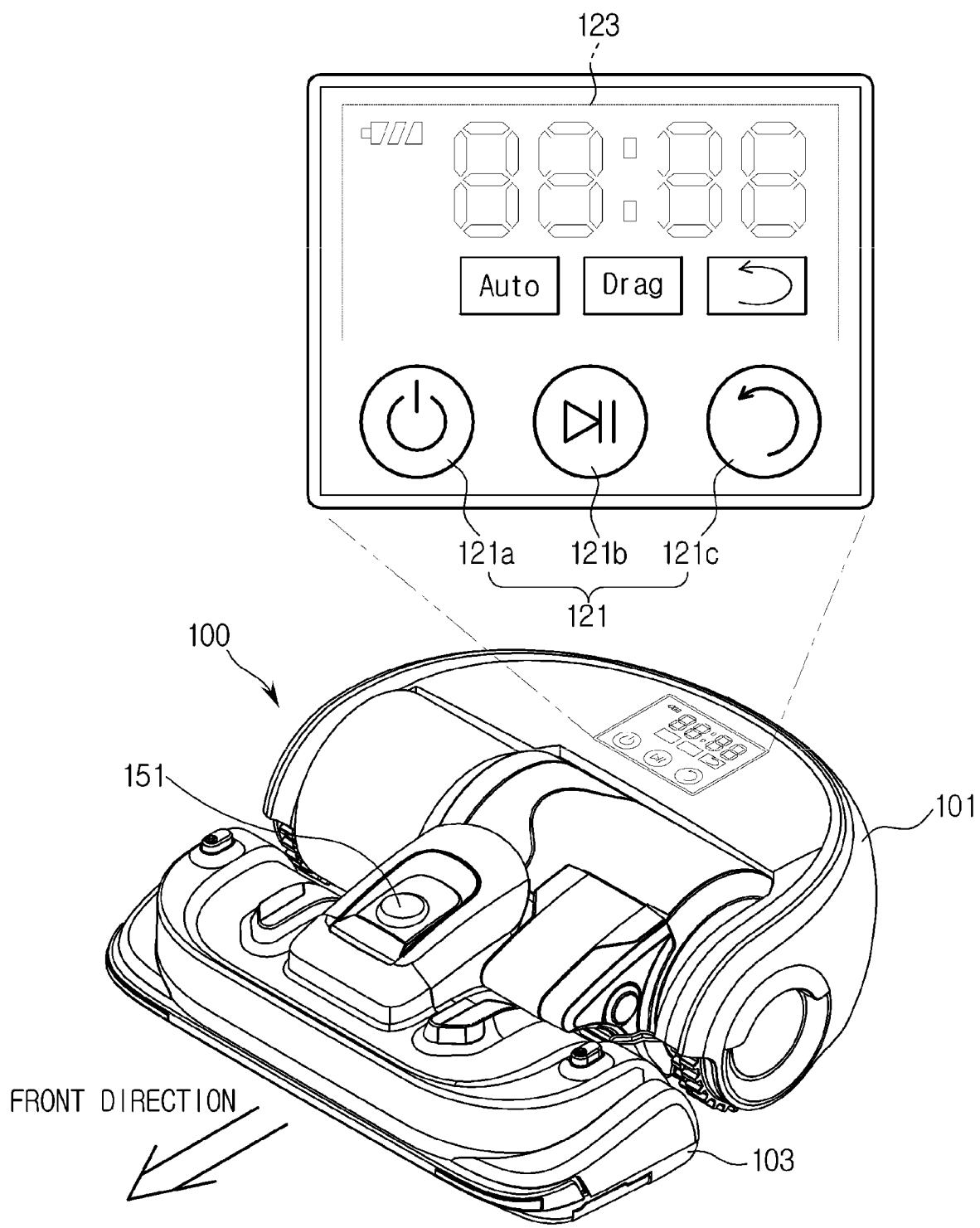
FIG. 2 shows an outer appearance of the cleaning robot according to an embodiment of the present disclosure.
Figure 3:
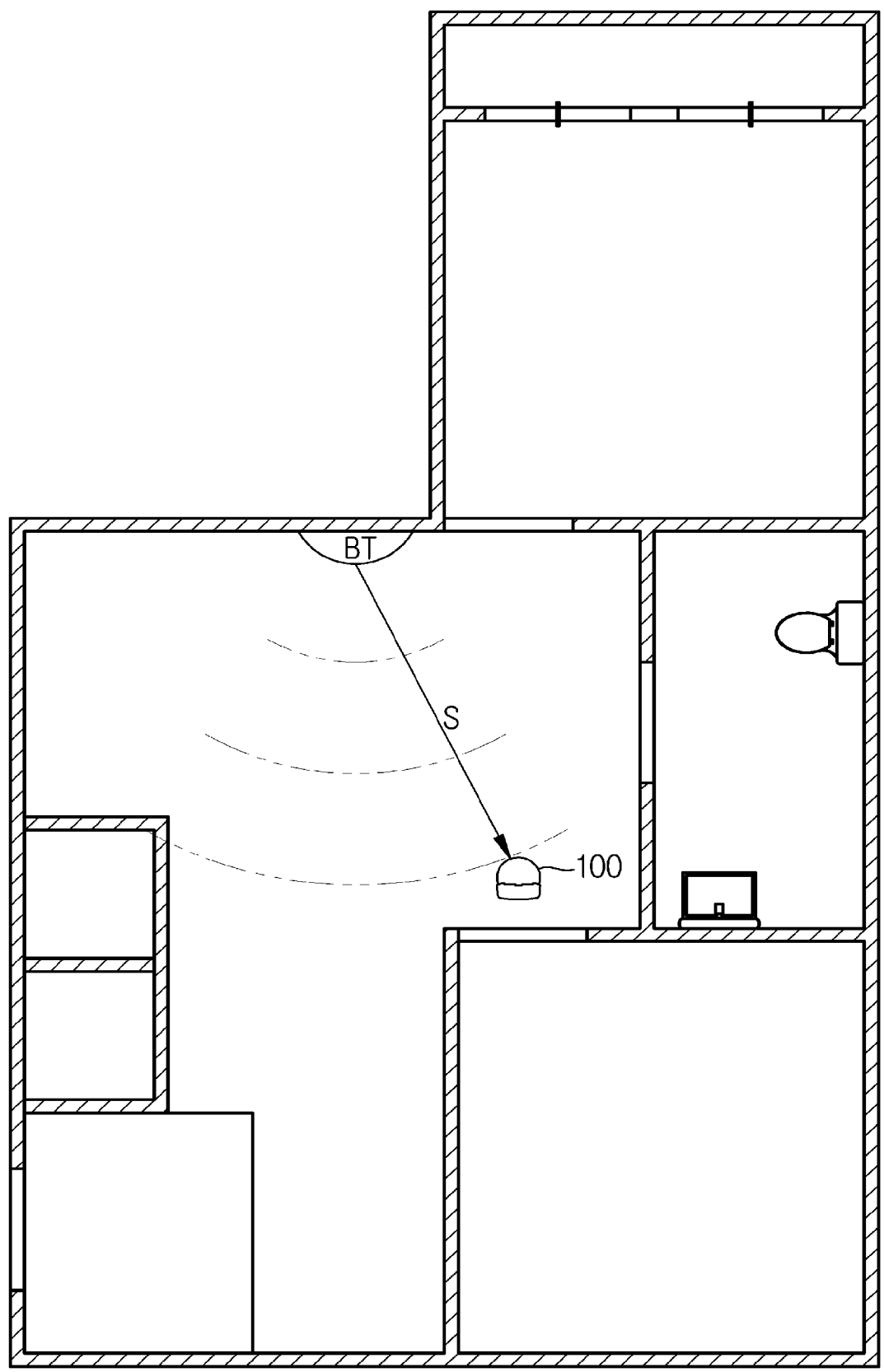
FIGS. 3 and 4 are views for describing an example of a method of detecting a location of the cleaning robot according to an embodiment of the present disclosure.
Figure 4:
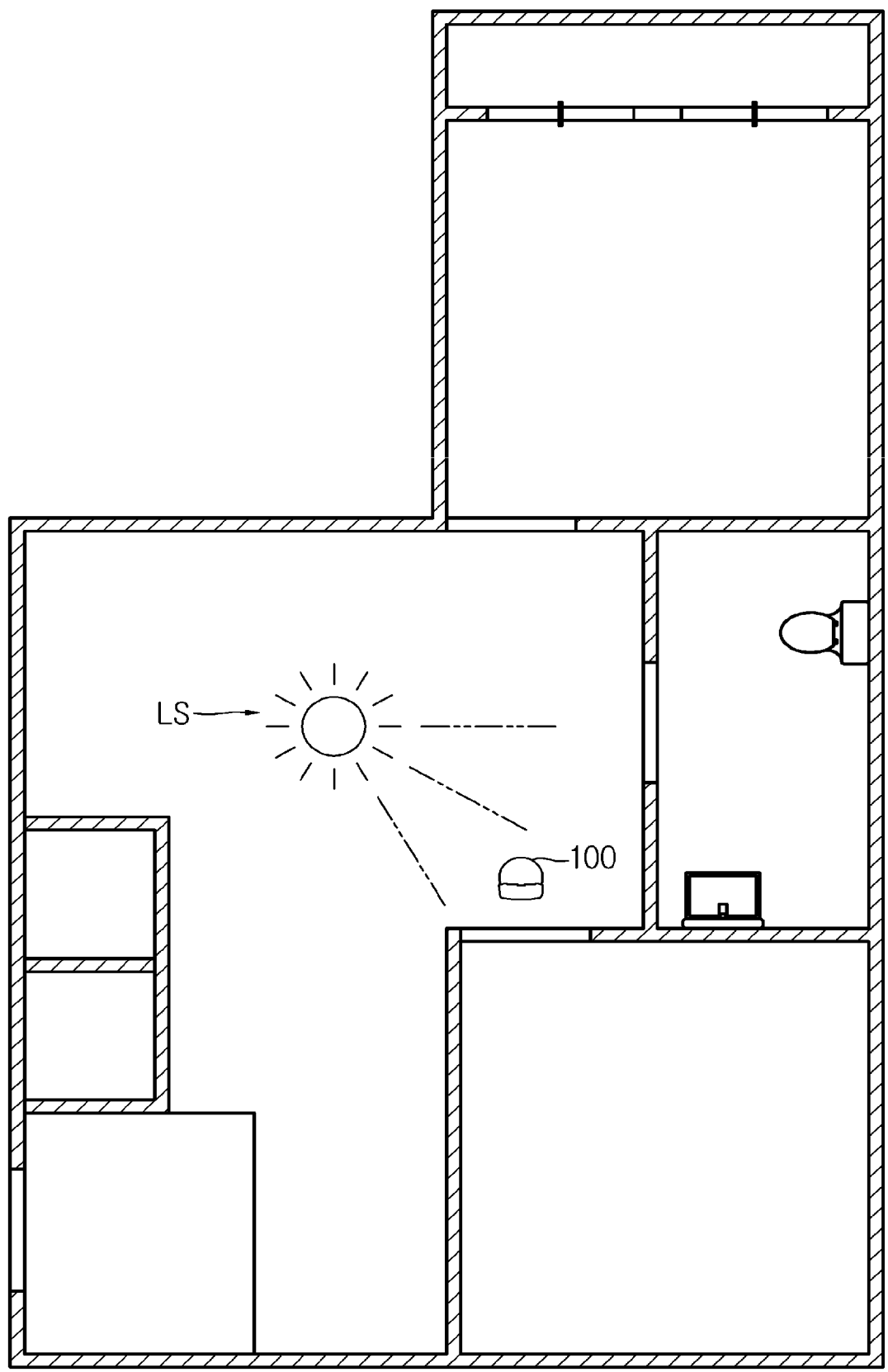
Figure 5:
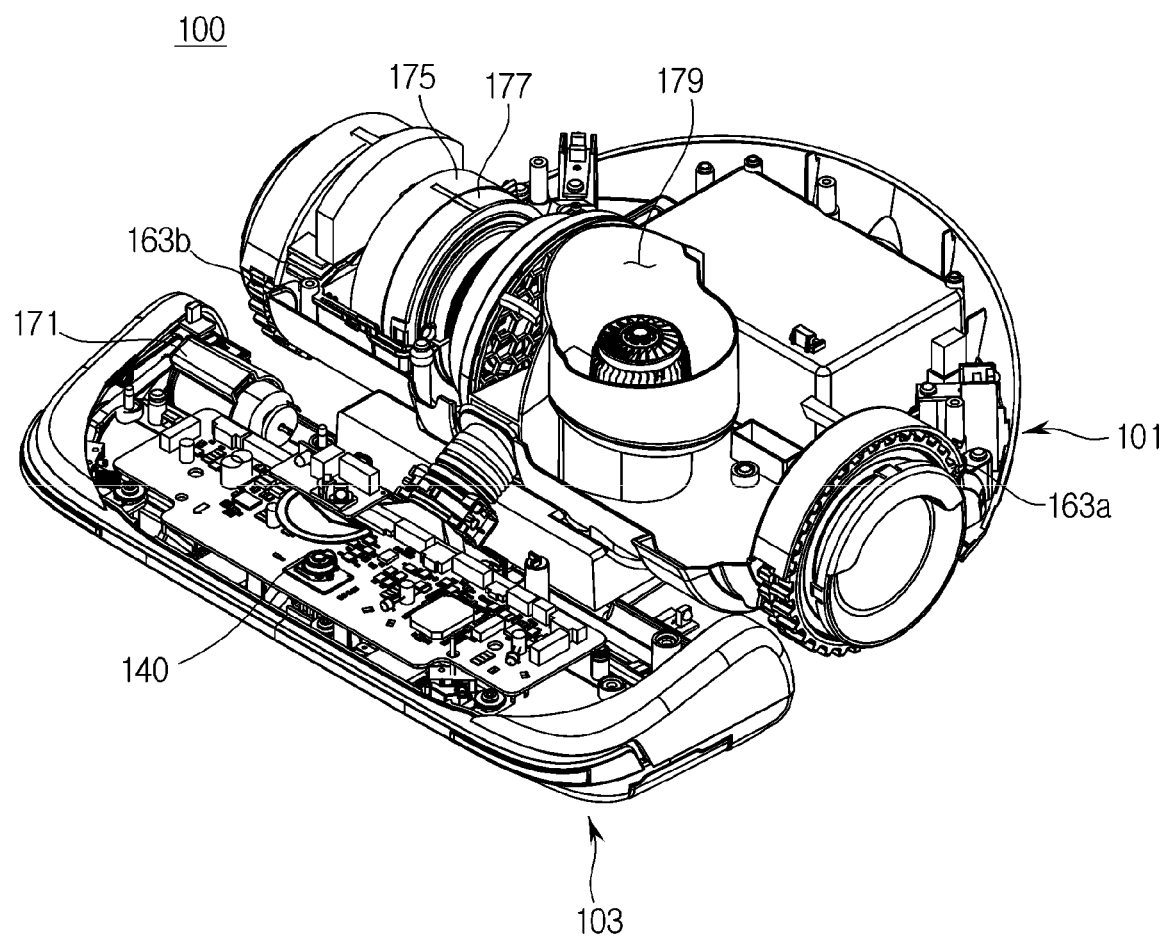
FIGS. 5 and 6 show an inside of the cleaning robot according to an embodiment of the present disclosure.
Figure 6:
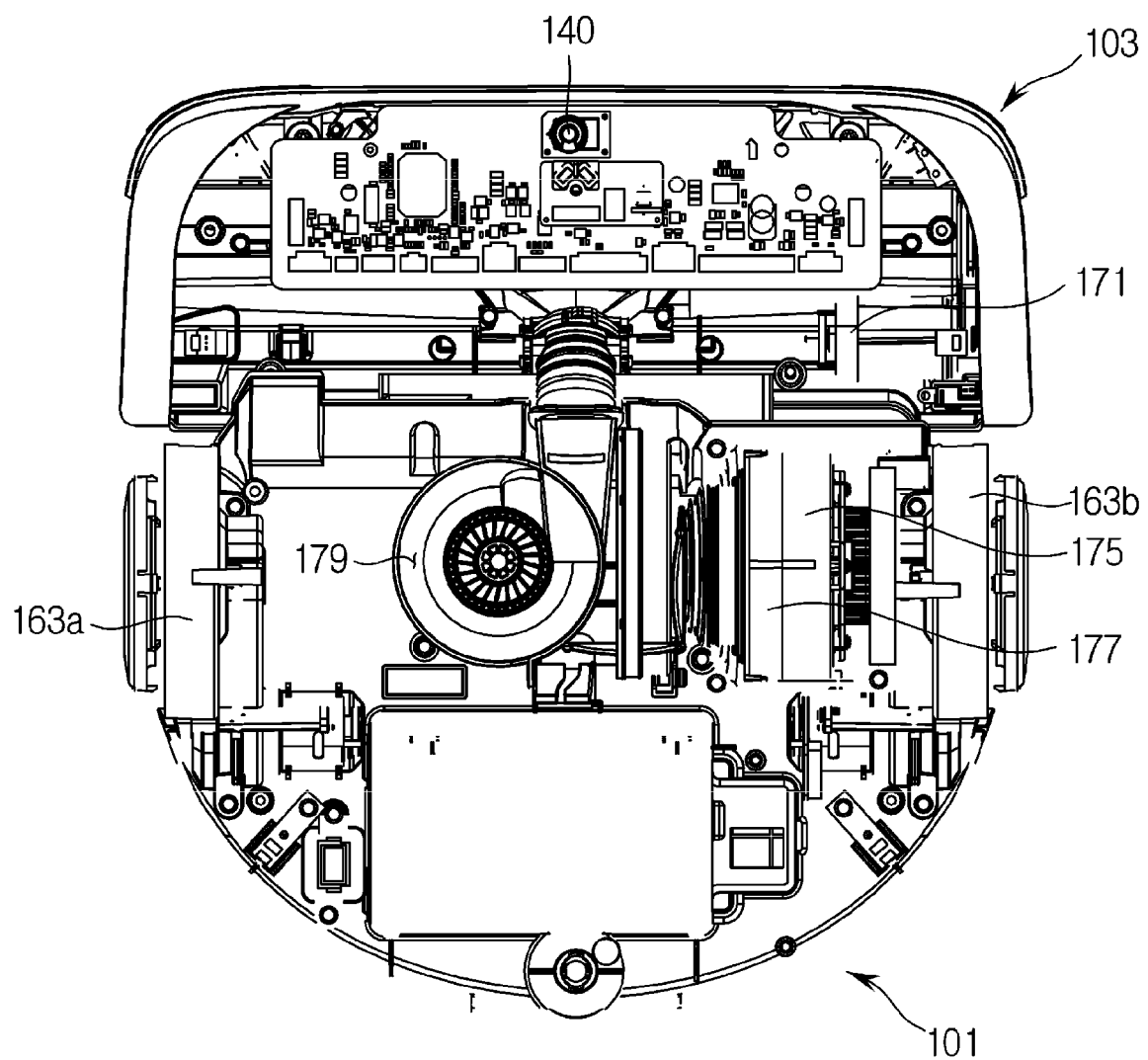
Figure 7:
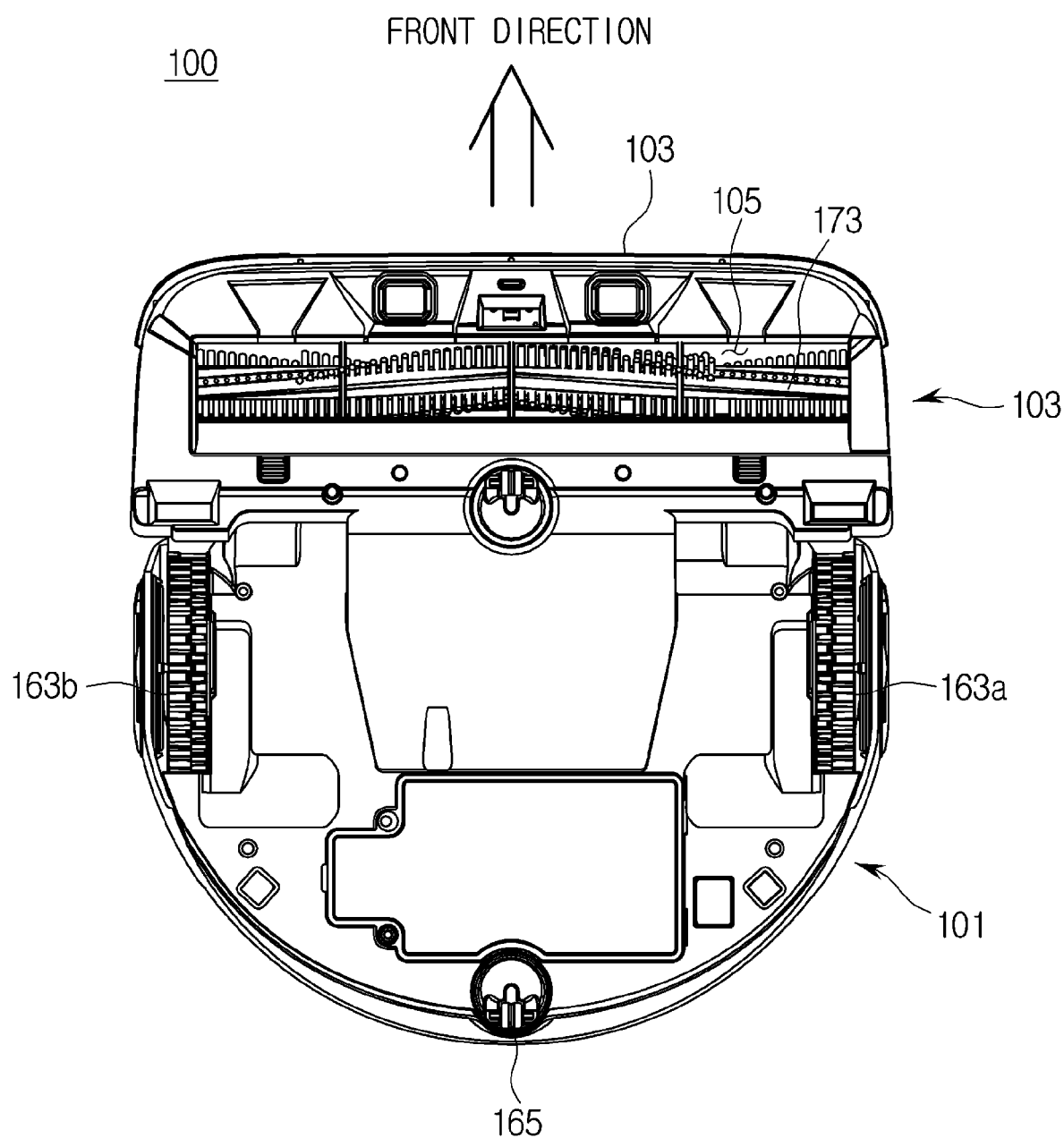
FIG. 7 shows a bottom of the cleaning robot according to an embodiment of the present disclosure.

FIG. 1 shows a control configuration of a cleaning robot according to an embodiment of the present disclosure, FIG. 2 shows an outer appearance of the cleaning robot according to an embodiment of the present disclosure, FIGS. 3 and 4 are views for describing an example of a method of detecting a location of the cleaning robot according to an embodiment of the present disclosure, FIGS. 5 and 6 show an inside of the cleaning robot according to an embodiment of the present disclosure, and FIG. 7 shows a bottom of the cleaning robot according to an embodiment of the present disclosure.

Referring to FIGS. 1 to 7, a cleaning robot 100 may include a main body 101 and a sub body 103. As shown in FIG. 2, the main body 101 may be in the shape of a semicylinder, and the sub body 103 may be in the shape of a rectangular parallelepiped.

Also, in the inside and outside of the main body 101 and the sub body 103, components for performing the functions of the cleaning robot 100 may be installed.

More specifically, the cleaning robot 100 may include a user interface 120 configured to interwork with a user, a motion detector 130 configured to detect information related to motions of the cleaning robot 100, a location detector 180 configured to detect a location of the cleaning robot 100, an image acquirer 150 configured to acquire images around the cleaning robot 100, an obstacle sensor 140 configured to sense an obstacle O existing in an area to be cleaned, a moving portion 160 configured to move the cleaning robot 100, a cleaning portion 170 configured to clean the area to be cleaned, and a controller 110 configured to control overall operations of the cleaning robot 100.

The user interface 120 may be, as shown in FIG. 2, mounted on an upper surface of the main body 101 of the cleaning robot 100, and may include a plurality of input buttons 121 to receive control commands from a user and a display 123 to display operation information of the cleaning robot 100.

The plurality of input buttons 121 may include a power button 121a to turn on/off the cleaning robot 100, an operation button 121b to operate or stop the cleaning robot 100, and a return button 121c to return the cleaning robot 100 to a charging station (not shown).

The individual buttons included in the plurality of input buttons 121 may adopt push switches or membrane switches to sense pressure applied by a user, or touch switches to sense a contact by a user's body part.

The display 123 may display information of the cleaning robot 100 in correspondence to a control command input by a user. For example, the display 123 may display an operation state of the cleaning robot 100, a power state of the cleaning robot 100, a cleaning mode selected by the user, whether to return to the charging station, etc.

The display 123 may adopt a Light Emitting Diode (LED) or an Organic Light Emitting Diode (OLED) that can be self-illuminated, or a Liquid Crystal Display (LCD) including a separate light emitting source.

Also, the display 123 may adopt a Touch Screen Panel (TSP) to receive a control command from the user, and to display operation information corresponding to the received control command.

The TSP may include a display to display operation information and a control command that can be input by the user, a touch panel to detect coordinates that the user's body part contacts, and a touch screen controller to determine a control command input by the user based on coordinates detected by the touch panel.

The touch screen controller may compare coordinates touched by the user and detected by the touch panel to coordinates of a control command that is to be displayed through the display to recognize the control command input by the user.

The motion detector 130 may detect a motion of the cleaning robot 100 when the cleaning robot 100 travels on an area to be cleaned.

More specifically, the motion detector 130 may detect acceleration, moving speed, moving displacement, a moving direction, etc. of the cleaning robot 100, when the cleaning robot 100 moves linearly. Also, the motion detector 130 may detect the revolutions per minute (RPM), rotational displacement, radius of rotation, etc. of the cleaning robot 100, when the cleaning robot 100 rotationally moves.

The motion detector 130 may include an acceleration sensor 131 to detect information about a linear movement of the cleaning robot 100, and a gyro sensor 133 to detect information about a rotational movement of the cleaning robot 100.

The acceleration sensor 131 may detect information about a linear movement of the cleaning robot 100. More specifically, the acceleration sensor 131 may detect linear acceleration, linear speed, linear displacement, etc. of the cleaning robot 100 using Newton's second law of motion (the law of acceleration).

The acceleration sensor 131 may adopt a piezoelectric acceleration sensor, a capacitive acceleration sensor, or a strain gauge type acceleration sensor.

The piezoelectric acceleration sensor may include a piezoelectric element to output an electrical signal according to mechanical deformation, and detect acceleration using the electrical signal output by the piezoelectric element. More specifically, the piezoelectric acceleration sensor may detect an electrical signal output from the piezoelectric element according to deformation of the piezoelectric element by acceleration, and calculate acceleration using the detected electrical signal.

The capacitive acceleration sensor may detect acceleration using a phenomenon that a distance between structures changes by an inertial force and capacitance changes by the change in distance. More specifically, the capacitive acceleration sensor may include a floating structure and a fixed structure, detect a change in distance between the structures by an inertial force as a change in capacitance, and calculate acceleration from the detected change in capacitance.

The strain gauge type acceleration sensor may detect acceleration using a strain gauge whose electrical resistance changes by mechanical deformation. More specifically, the strain gauge type acceleration sensor may detect deformation of a structure caused by acceleration as a change in electrical resistance, and calculate acceleration using the detected change in electrical resistance.

Also, the acceleration sensor 131 may adopt a miniaturized Micro Electro Mechanical System (MEMS) type sensor developed by merging Micro Machines, Micro Electronics, and semiconductor processing technologies.

The gyro sensor 133 is also called a gyroscope or an angular velocity sensor to detect information about a rotational movement of the cleaning robot 100. More specifically, the gyro sensor 133 may detect the rotational angular speed, rotational displacement, etc. of an object that is to be detected, using the law of conservation of angular momentum, the Sagnac effect, the Coriolis's force, etc.

The gyro sensor 133 may adopt a Gimbal gyro sensor, an optical gyro sensor, or a vibrating gyro sensor.

The Gimbal gyro sensor may detect a rotational movement of an object using conservation of angular momentum in which a rotating object tends to maintain a rotation axis being the center of rotation constant and precession in which the rotation axis of a rotating object rotates along a specific trajectory by a rotational repulsive force when an external force is applied to the rotating object.

The optical gyro sensor may detect a rotational movement of an object using the Sagnac effect in which light beams transmitted in a clockwise direction and a counterclockwise direction along a circular light path arrive at the transmission point of the light beams at different times by a rotation of an object.

The vibrating gyro sensor may detect a rotational movement of an object using the Coriolis's force generated by a rotation of an object. More specifically, the vibrating gyro sensor may detect a rotational movement of an object using a phenomenon in which if an object vibrating in a specific direction rotates, the object vibrates in a different direction by the Coriolis's force.

The gyro sensor 133 may also adopt a MEMS type sensor. For example, a capacitive gyro sensor among MEMS type gyro sensors may detect deformation of a micro-mechanical structure, caused by the Coriolis's force that is proportional to RPM, as a change in capacitance, and calculate RPM from the change in capacitance.

However, the motion detector 130 is not limited to the acceleration sensor 131 and the gyro sensor 133. For example, the motion detector 130 may include an encoder (not shown) to sense a rotation of traveling wheels 163 of the moving portion 160 which will be described later.

The encoder may include a light emitting element to emit light, a light receiving element to receive light, rotary slits and fixed slits disposed between the light emitting element and the light receiving element, and an encoder controller to detect RPM and rotational displacement of the rotary slits. The rotary slits may rotate together with the traveling wheels 163, and the fixed slits may be fixed at the main body 101.

According to a rotation of the rotary slits, light emitted from the light emitting element may pass through the rotary slits to arrive at the light receiving element, or may be blocked by the rotary slits. The light receiving element may receive pulsed light according to a rotation of the rotary slits, and output an electrical signal according to the received light.

Also, the encoder controller may calculate RPM and rotational displacement of the traveling wheels 163 based on the electrical signal output from the light receiving element, calculate linear movement speed, linear movement displacement, rotational movement speed, rotational movement displacement, etc. of the cleaning robot 100 based on the RPM and rotational displacement of the traveling wheels 163, and provide the calculated values to the controller 110 which will be described later.

The location detector 180 may detect a location of the cleaning robot 100. The location detector 180 may include a beacon communication unit 181 to receive a beacon signal transmitted from a beacon terminal BT, and an illuminance sensor 182 to detect an amount of light around the cleaning robot 100, in order to detect a location of the cleaning robot 100.

FIG. 3 is a view for describing a method of detecting a location of the cleaning robot using beacon communication, and FIG. 4 is a view for describing a method of detecting a location of the cleaning robot using the illuminance sensor.

Referring to FIG. 3, the beacon communication unit 181 may receive a beacon signal S transmitted from the beacon terminal BT to calculate a distance to the beacon terminal BT, thereby detecting a location of the cleaning robot 100. The beacon communication unit 181 may calculate a distance to the beacon terminal BT, or the controller 110 may receive a beacon signal from the beacon communication unit 181 to calculate a distance between the cleaning robot 100 and the beacon terminal BT.

The beacon communication unit 181 may communicate with the beacon terminal BT using various methods, such as Bluetooth beacon communication, Wireless Fidelity (Wi-Fi) beacon communication, LED beacon communication, and sound-based low-frequency beacon communication. The beacon communication unit 181 may support all of the above-described various beacon communication methods, or any one beacon communication method selected from among the various beacon communication methods. The beacon communication unit 181 may select a beacon communication method that is supported by the beacon terminal BT.

Referring to FIG. 4, the illuminance sensor 182 may detect an intensity of light emitted from a light source LS such as an electric lamp, and calculate a distance to the light source LS based on the intensity of light, thereby detecting a location of the cleaning robot 100. The illuminance sensor 182 may calculate a distance to the light source LS, or the controller 110 may receive a signal regarding an intensity of light from the illuminance sensor 182 to calculate a distance between the cleaning robot 100 and the light source LS. The cleaning robot 100 may include a single illuminance sensor 182 at a specific location or a plurality of illuminance sensors 182 at various locations. The location detector 180 may include a laser sensor or a geomagnetic sensor, as well as the beacon communication unit 181 and the illuminance sensor 182 described above, and may detect location information of the cleaning robot 100 using information acquired by the laser sensor or the geomagnetic sensor.

The location detector 180 may combine the results of detection by the beacon communication unit 181 and the illuminance sensor 182 to more accurately detect a location of the cleaning robot 100. Also, the controller 110 may combine the results of detection by the beacon communication unit 181 and the illuminance sensor 182 to more accurately detect a location of the cleaning robot 100. Also, the controller 110 may use a feature point map created using the result of detection by the location detector 180, the result of detection by the motion detector 130, and the result of detection by the image acquirer 150 which will be described later to more accurately detect a location of the cleaning robot 100.

The image acquirer 150 may include a camera module 151 to acquire a view above the cleaning robot 100.

The camera module 151 may be disposed on the upper surface of the sub body 103 included in the cleaning robot 100, and may include a lens to concentrate light emitted upward from the cleaning robot 100, and an image sensor to convert light into an electrical signal.

Also, the image sensor may adopt a Complementary Metal Oxide Semiconductor (CMOS) sensor or a Charge Coupled Device (CCD) sensor.

The camera module 151 may convert an image of a view above the cleaning robot 100 into an electrical signal (hereinafter, referred to as an upper view image) that can be processed by the controller 110, and transfer the electrical signal to the controller 110. The upper view image provided by the image acquirer 150 may be used by the controller 110, together with information acquired by the motion detector 130 and information acquired by the location detector 180, to detect a location of the cleaning robot 100. Also, the controller 110 may extract a feature point from the upper view image, and create a feature point map using the feature point. Details about the operation will be described in detail, later.

The obstacle sensor 140 may sense an obstacle O interfering with a movement of the cleaning robot 100.

Herein, the obstacle O may be anything protruding from a floor to be cleaned to interfere with a movement of the cleaning robot 100, or recessed from the floor to interfere with a movement of the cleaning robot 100. The obstacle O may be furniture, such as a table, a sofa, and the like, a wall partitioning a floor to be cleaned, or a hall that is lower than the floor to be cleaned.

The obstacle detector 140 may include an optical module 141 to emit light forward from the cleaning robot 100 and to receive light reflected from the obstacle O or the like, and a rotation driver 143 to rotate the optical module 141.

Figure 8:
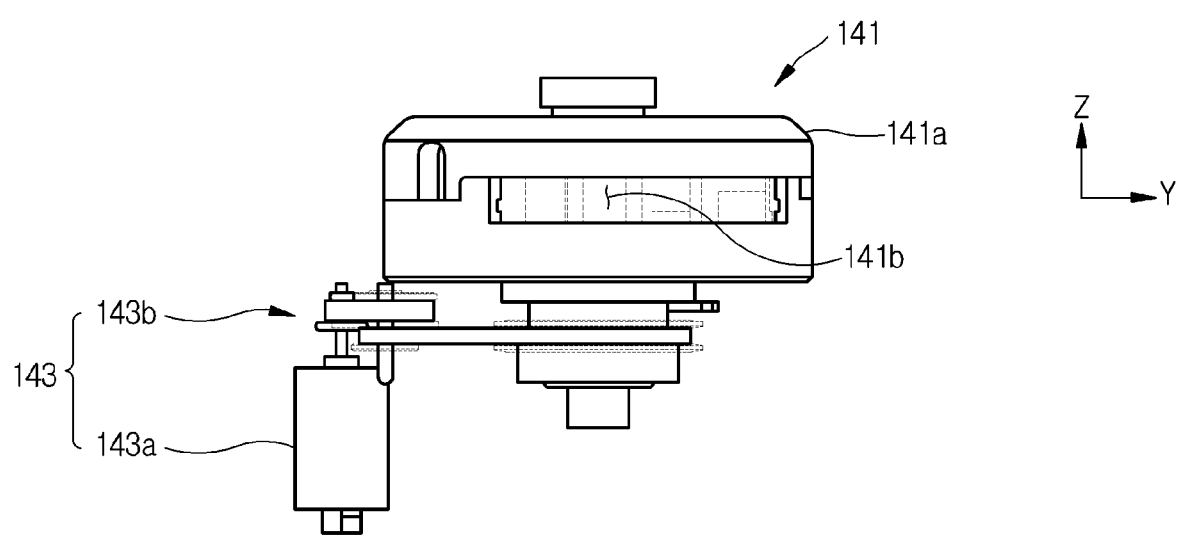
FIGS. 8 and 9 show a structure of the obstacle sensor of the cleaning robot according to an embodiment of the present disclosure.
Figure 9:
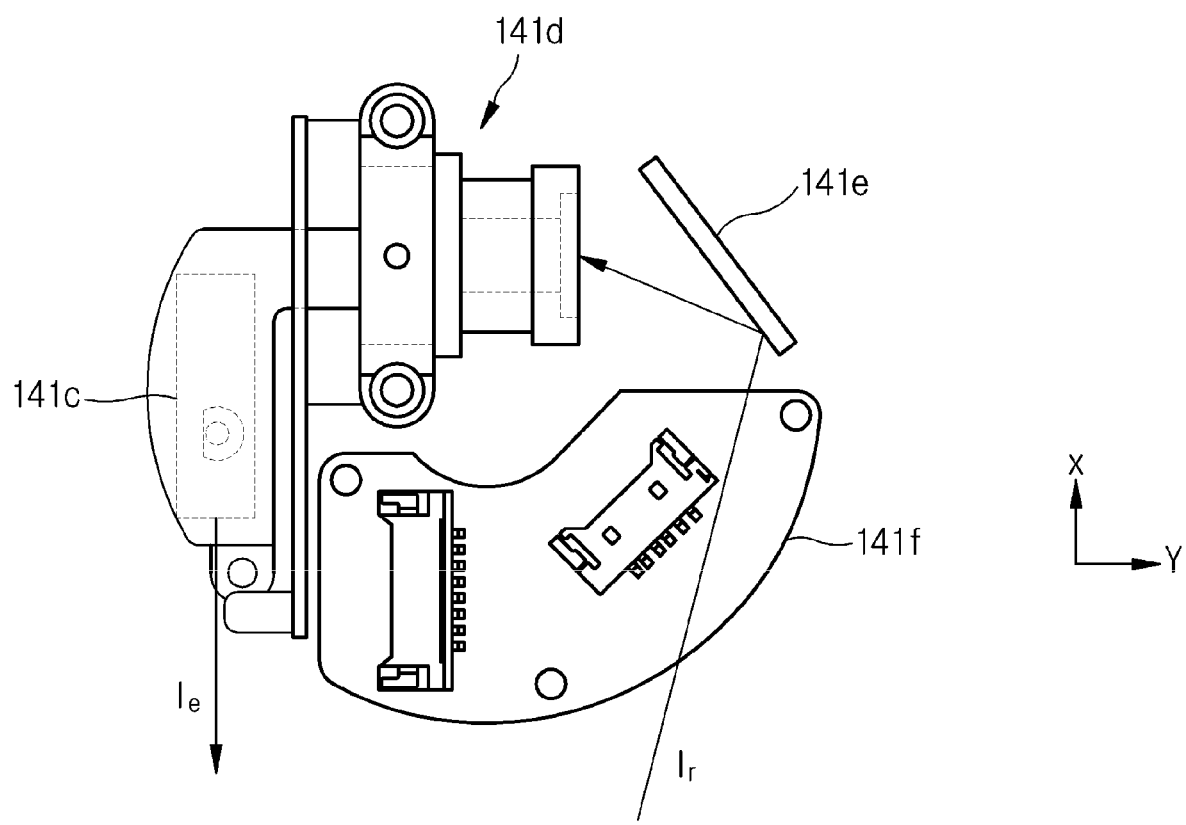
Figure 10:
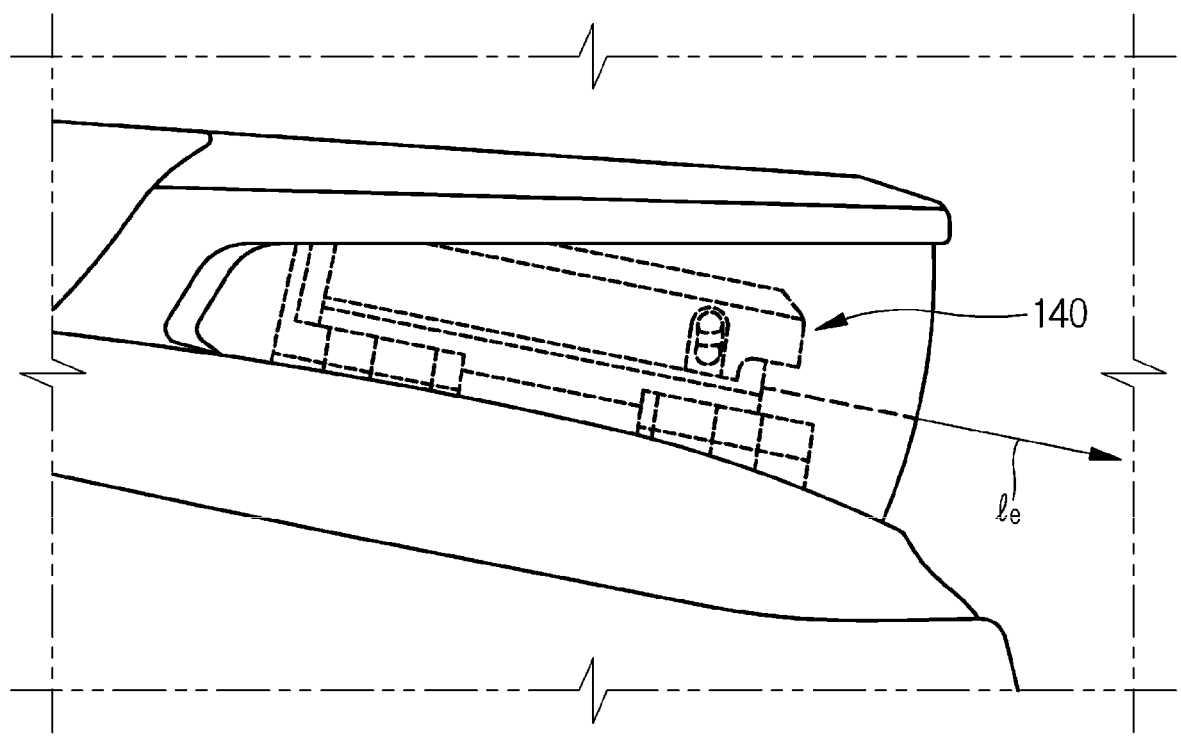
FIGS. 10 and 11 show an example of a state in which the obstacle sensor of the cleaning robot according to an embodiment of the present disclosure is installed.
Figure 11:
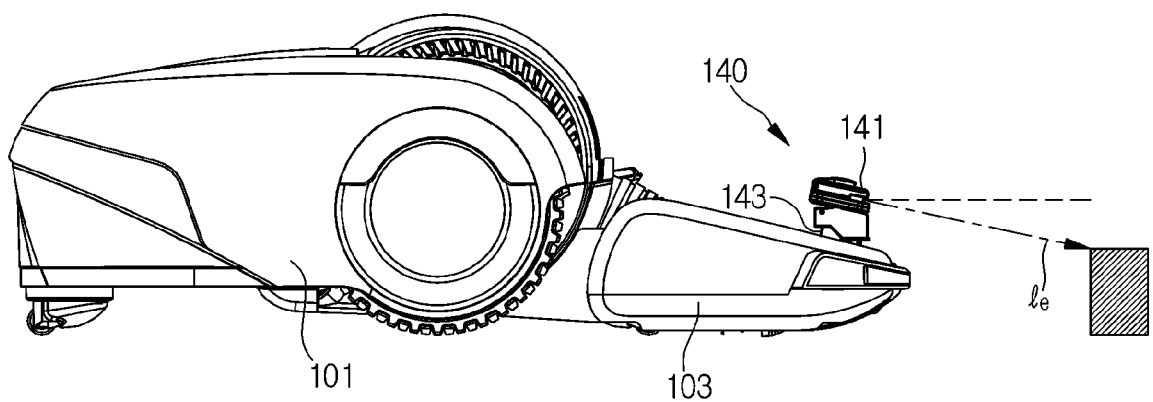

FIGS. 8 and 9 show a structure of the obstacle sensor of the cleaning robot according to an embodiment of the present disclosure, and FIGS. 10 and 11 show an example of a state in which the obstacle sensor of the cleaning robot according to an embodiment of the present disclosure is installed.

As shown in FIG. 8, the rotation driver 143 may be disposed below the optical module 141 to rotate the optical module 141 by 360 degrees. The rotation driver 143 may include a motor 143a to generate power for rotating the optical module 141 forward and backward, and a power transfer portion 143b to apply a rotational force generated by the motor 143a to the optical module 141. According to an embodiment, the power transfer portion 143b may include a pulley and a belt, and transfer power to the optical module 141 through the pulley and the belt. According to another embodiment, the power transfer portion 143b may include a gear assembly, and transfer power to the optical module 141 through the gear assembly. Also, although not shown in the drawings, the rotation driver 143 may further include a motor driving circuit (not shown) to supply driving current to the motor 143a according to a control signal from the controller 110.

The optical module 141 located above the rotation driver 143 may include a housing 141a formed in the shape of a cylinder, and a light emitting portion 141c and a light receiving portion disposed inside the housing 141a. The housing 141a may include an opening 141b to pass light 1e emitted from the light emitting portion 141c and light 1r incident to the light receiving portion from the outside.

The light emitting portion 141c may adopt a LED of emitting light in different directions, or a Light Amplication by Simulated Emission of Radiation (LASER) diode. However, since the optical module 141 according to the current embodiment can irradiate light in all directions by rotating by the rotation driver 143, a laser source such as a LASER diode having excellent resolution may be preferably used as the light emitting portion 141c.

The light emitting portion may include an image sensor 141d, and a reflective mirror 141e to change a path of light reflected by an obstacle O toward the image sensor 141d.

As shown in FIG. 9, the image sensor 141d may receive light reflected by the reflective mirror 141e. More specifically, the image sensor 141d may acquire a 2Dimensional (2D) image formed on the reflective mirror 141e by reflected light reflected by the obstacle O. The image sensor 141d may be a 2D image sensor in which light sensors are arranged two-dimensionally.

The image sensor 141d may adopt a Complementary Metal Oxide Semiconductor (CMOS) sensor or a Charge Coupled Device (CCD) sensor. Preferably, the image sensor 141d may adopt an image sensor 141d capable of receiving light of a wavelength that is identical to that of light emitted from the light emitting portion 141c.

Also, the optical module 141 may include a light emitting portion driving circuit 141f to supply driving current to the light emitting portion 141c according to a control signal from the controller 110.

The obstacle sensor 140 may be tilted downward at a predetermined angle with respect to a front direction, as shown in FIGS. 10 and 11. FIG. 10 shows a part of the outer appearance of the cleaning robot 100 in which the obstacle sensor 140 is installed. For easy understanding, the obstacle sensor 140 installed in the inside of the cleaning robot 100 is shown. FIG. 11 is a side view of an internal structure of the cleaning robot 100, provided to more clearly show the tilted obstacle sensor 140. As shown in FIGS. 8 and 11, light irradiated from the obstacle sensor 140 may proceed downward at an angle at which the obstacle sensor 140 is tilted with respect to the front direction.

According to another embodiment, the optical module 141 of the obstacle sensor 140 may be tiltable in an up-down direction within a predetermined range. According to a tilting angle of the optical module 141, the optical module 141 can irradiate light obliquely downward as described above, irradiate light obliquely upward, or irradiate light forward.

Preferably, the obstacle sensor 140 according to the current embodiment may be tilted downward at a predetermined angle, as shown in FIG. 11, or maintained to be tilted downward, in order to sense a height of an obstacle. Details about this will be described later. According to still another embodiment, the obstacle sensor 140 may adopt a 3D depth sensor in order to sense a height of an obstacle.

The obstacle sensor 140 of the cleaning robot 100 may further include an additional sensor for more accurately sensing an obstacle, together with the optical module 141 configured to be rotatable by the rotation driver 143. For example, the optical sensor 140 may include a side optical sensor module 145 disposed on a side surface of the cleaning robot 100. The side optical sensor module 145 may include a left optical sensor module 145a to emit light obliquely to the left of the cleaning robot 100 and to receive light reflected from an obstacle O, and a right optical sensor module 145b to emit light obliquely to the right of the cleaning robot 100 and to receive light reflected from an obstacle O. The side light sensor module 145 may be used for traveling of the cleaning robot 100, as well as for detecting an obstacle O.

For example, in the case of outline follow-up driving in which the cleaning robot 100 maintains a predetermined distance to an obstacle O upon moving, the side optical sensor module 145 may detect a distance between a side of the cleaning robot 100 and an obstacle O, and the controller 110 may control the moving portion 160 based on the result of the detection by the side optical sensor module 145 so that the cleaning robot 100 can maintain a predetermined distance to the obstacle O.

The side optical sensor module 145 may be used to assist the optical module 141 for sensing an obstacle O located in front of the cleaning robot 100. However, the obstacle sensor 140 may not include the side optical sensor module 145.

The moving portion 160 may move the cleaning robot 100, and include a wheel driving motor 161, the traveling wheels 163, and a caster wheel 155, as shown in FIG. 1.

As shown in FIGS. 5 to 7, the traveling wheels 163 may be disposed at both edges of the bottom of the main body 101, and include a left traveling wheel 163a disposed at the left portion of the cleaning robot 100 with respect to the front direction of the cleaning robot 100, and a right traveling wheel 163b disposed at the right portion of the cleaning robot 100 with respect to the front direction of the cleaning robot 100.

Also, the traveling wheels 163 may receive a rotational force from the wheel driving motor 161 to move the cleaning robot 100.

The wheel driving motor 161 may generate a rotational force for rotating the traveling wheels 163, and include a left driving motor 161a to rotate the left traveling wheel 163a and a right driving motor 161b to rotate the left traveling wheel 163b.

The left driving motor 161*a* and the right driving motor 161*b* may receive driving control signals respectively from the controller 110 to operate independently.

The left traveling wheel 163*a* and the right traveling wheel 163*b* may rotate independently by the left driving motor 161*a* and the right driving motor 161*b* operating independently.

Also, since the left traveling wheel 163*a* and the right traveling wheel 163*b* can rotate independently, the cleaning robot 100 may travel in various ways, such as forward driving, backward driving, and standing rotation.

For example, if both of the left and right traveling wheels 163*a* and 163*b* rotate in a first direction, the cleaning robot 100 may travel linearly forward (move forward), and if both of the left and right traveling wheels 163*a* and 163*b* rotate in a second direction, the main body 101 may travel linearly backward (move backward).

Also, if the left and right traveling wheels 163*a* and 163*b* rotate at different speeds in the same direction, the cleaning robot 100 may travel rotationally to the right or left, and if the left and right traveling wheels 163*a* and 163*b* rotate in different directions, the cleaning robot 100 may rotate in a clockwise or counterclockwise direction in place.

The caster wheel 165 may be mounted on the bottom of the main body 101 so that the axis of rotation of the caster wheel 165 can rotate according to a movement direction of the cleaning robot 100. The caster wheel 165 whose axis of rotation rotates according to a movement direction of the cleaning robot 100 may enable the cleaning robot 100 to travel in a stable position, without interfering with driving of the cleaning robot 100.

Also, the moving portion 160 may include a motor driving circuit (not shown) to supply driving current to the wheel driving motor 163 according to a control signal from the controller 110, a power transfer module (not shown) to transfer a rotational force of the wheel driving motor 161 to the traveling wheels 163, and a rotation sensor (not shown) to detect rotational displacement and RPM of the wheel driving motor 161 or the traveling wheels 163.

The cleaning portion 170 may include a drum brush 173 to scatter dust existing on a floor to be cleaned, a brush driving motor 171 to rotate the drum brush 173, a dust suction fan 177 to suck in the scattered dust, a dust suction motor 175 to rotate the dust suction fan 177, and a dust case 177 to store the sucked dust.

The drum brush 173 may be disposed in a dust suction opening 105 formed in the bottom of the sub body 103, as shown in FIG. 7, and may rotate with respect to a rotating shaft disposed horizontally to the bottom of the sub body 103 to scatter dust existing on the floor to the inside of the dust suction opening 105.

The brush driving motor 171 may be disposed adjacent to the drum brush 173 to rotate the drum brush 173 according to a cleaning control signal from the controller 110.

Although not shown in the drawings, the cleaning portion 170 may further include a motor driving circuit (not shown) to supply driving current to the brush driving motor 171 according to a control signal from the controller 110, and a power transfer module (not shown) to transfer a rotational force of the brush driving motor 171 to the drum brush 173.

The dust suction fan 177 may be disposed in the main body 101, as shown in FIGS. 5 and 6, to suck dust scattered by the drum brush 173 into the dust case 179.

The dust suction motor 175 may be disposed adjacent to the dust suction fan 177 to rotate the dust suction fan 177 according to a control signal from the controller 110.

Although not shown in the drawings, the cleaning portion 170 may further include a motor driving circuit (not shown) to supply driving current to the dust suction motor 175 according to a control signal from the controller 110, and a power transfer module (not shown) to transfer a rotational force of the dust suction motor 175 to the dust suction fan 177.

The dust case 179 may be disposed in the main body 101, as shown in FIGS. 5 and 6, to store dust sucked by the dust suction fan 177.

Also, the cleaning portion 170 may include a dust guide tube to guide dust sucked through the dust suction opening 105 of the sub body 103 to the dust case 179 provided in the main body 101.

The controller 110 may control overall operations of the cleaning robot 100.

More specifically, the controller 110 may include an input/output interface 117 to mediate data incoming/outgoing between various components included in the cleaning robot 100 and the controller 110, memory 115 to store programs and data, a graphic processor 113 to perform image processing, and a main processor 111 to perform operations according to the programs and data stored in the memory 113. Also, the controller 110 may include a system bus 119 to mediate data transmission/reception between the input/output interface 117, the memory 115, the graphic processor 113, and the main processor 111.

The input/output interface 117 may receive a user command received by the user interface 120, motion information of the cleaning robot 100 detected by the motion detector 130, and obstacle location information sensed by the obstacle sensor 140, and transmit the received information to the main processor 111, the graphic processor 113, the memory 115, etc. through the system bus 119.

Also, the input/output interface 117 may transfer various control signals output from the main processor 111 to the user interface 120, the moving portion 160, or the cleaning portion 170.

The memory 115 may temporarily store control programs and control data for controlling operations of the cleaning robot 100, a user command received by the user interface 120, motion information detected by the motion detector 130, obstacle location information and obstacle height information sensed by the obstacle sensor 140, and various control signals output from the main processor 111.

The memory 115 may include volatile memory, such as Static Random Access Memory (S-RAM) and Dynamic Random Access Memory (D-RAM), and non-volatile memory, such as flash memory, Read Only Memory (ROM), Erasable Programmable Read Only Memory (EPROM), Electrically Erasable Programmable Read Only Memory (EEPROM), etc.

More specifically, the non-volatile memory may semi-permanently store the control programs and control data for controlling operations of the cleaning robot 100, and the volatile memory may load the control programs and control data from the non-volatile memory to temporarily store the control programs and control data, or may temporarily store a user command received by the user interface 120, motion information detected by the motion detector 130, obstacle location information and obstacle height information sensed by the obstacle sensor 140, and various control signals output from the main processor 111.

The graphic processor 113 may convert a reflected light image acquired by the obstacle sensor 140 into an image of resolution that can be processed by the main processor 111, or into a format that can be processed by the main processor 111.

The main processor 111 may process data stored in the memory 115 according to a control program stored in the memory 115.

For example, the main processor 161 may process the results of sensing by the motion detector 130 and the obstacle sensor 140, and generate control signals for controlling the moving portion 160 and the cleaning portion 170.

The main processor 111 may create driving record information based on motion information of the cleaning robot 100 detected by the motion detector 130 to store the driving record information in the memory 115, or may calculate a direction in which an obstacle O is located, a distance to the obstacle O, a height of the obstacle O, and a size of the obstacle O, based on a reflected light image acquired by the obstacle sensor 140.

Also, the main processor 111 may calculate a traveling path for avoiding the obstacle O according to the direction in which the obstacle O is located, the distance to the obstacle O, the height of the obstacle O, and the size of the obstacle O, and generate a traveling control signal that is to be provided to the moving portion 160 so that the cleaning robot 100 can move according to the calculated traveling path.

The controller 110 may determine a location and movement of the cleaning robot 100 based on motion information detected by the motion detector 130, and determine a location, size, etc. of an obstacle based on an obstacle sensed signal from the obstacle sensor 140.

Also, the controller 110 may control the moving portion 160 so that the cleaning robot 100 travels on a floor to be cleaned, and control the cleaning portion 170 so that the cleaning robot 100 travels to clean the floor. Operation of the cleaning robot 100, which will be described below, can be interpreted as operation by the control operation of the controller 110.

Hereinafter, a method in which the obstacle sensor 140 senses a height of an obstacle O and creates a 3D obstacle map using the sensed height of the obstacle O will be described.

Figure 12:
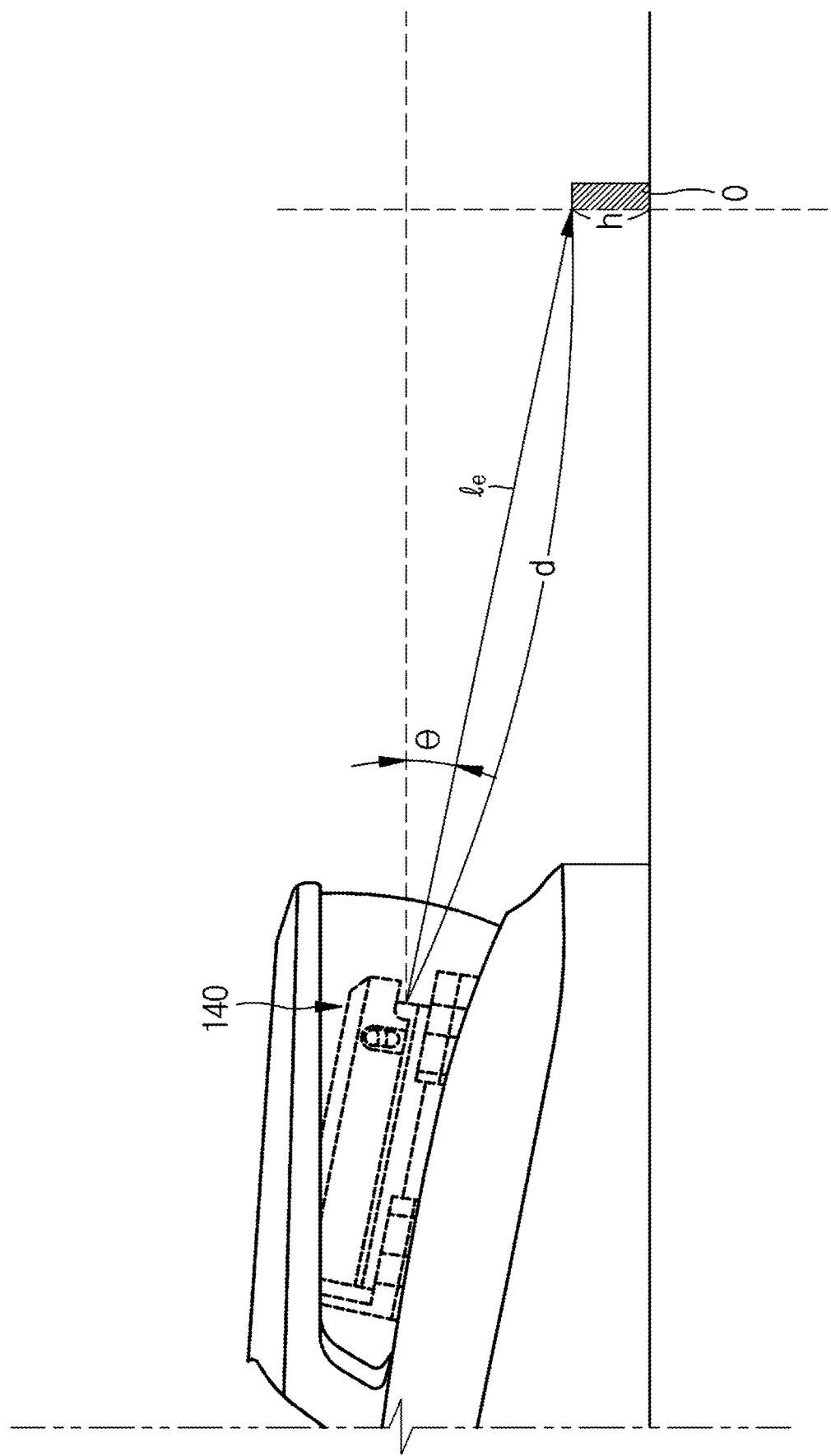
FIG. 12 is a view for describing an example of a method in which the obstacle sensor 140 of the cleaning robot 100 according to an embodiment of the present disclosure senses a height of an obstacle.
Figure 13:
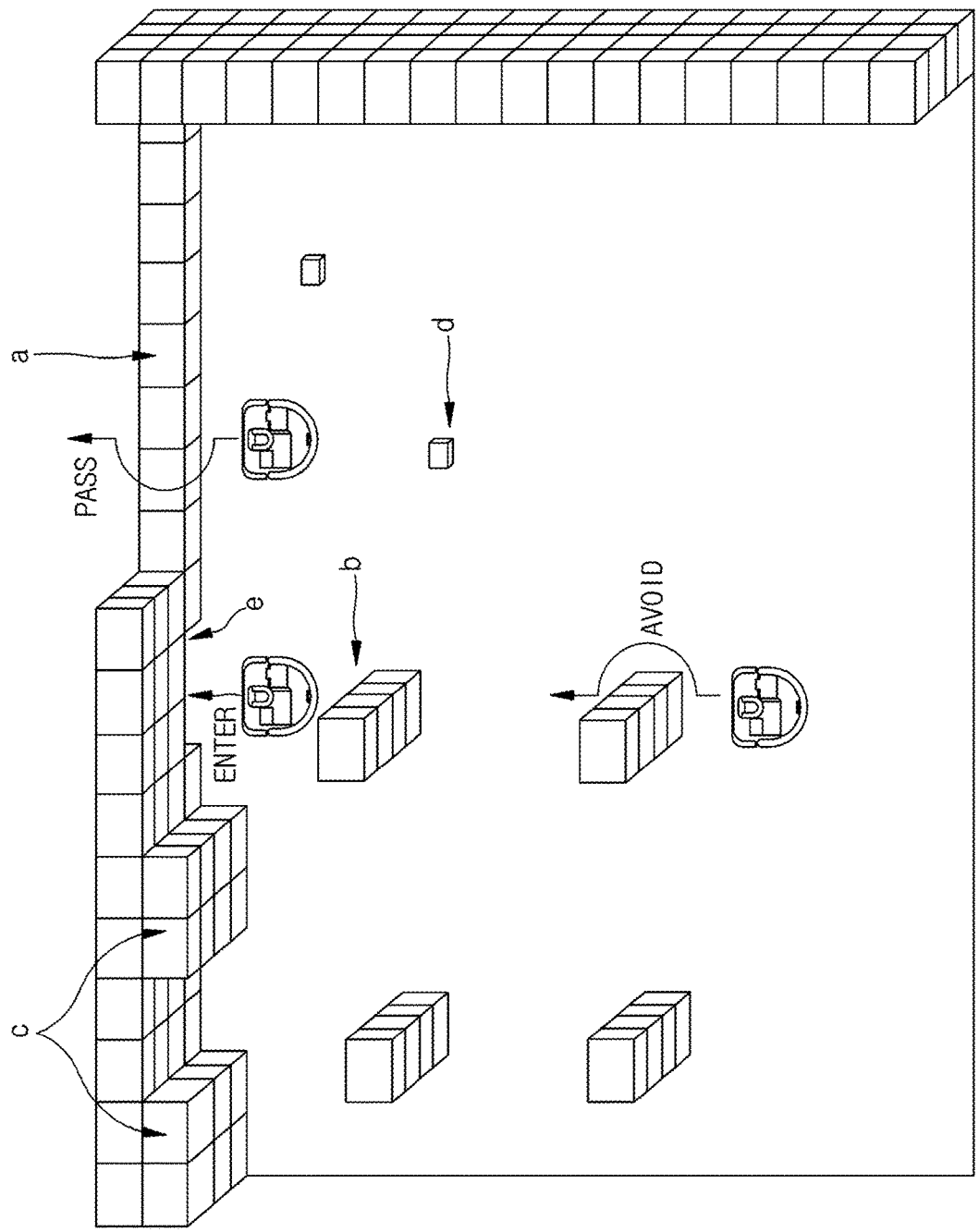
FIG. 13 shows an example of a 3D obstacle map created using the height of the obstacle in the cleaning robot 100 according to an embodiment of the present disclosure.

FIG. 12 is a view for describing an example of a method in which the obstacle sensor 140 of the cleaning robot 100 according to an embodiment of the present disclosure senses a height of an obstacle, and FIG. 13 shows an example of a 3D obstacle map created using the height of the obstacle in the cleaning robot 100 according to an embodiment of the present disclosure.

As shown in FIG. 12, the obstacle sensor 140 may be tilted downward at a predetermined angle with respect to the front direction so that light irradiated from the obstacle sensor 140 can be directed downward. Accordingly, light generated by the obstacle sensor 140 may be irradiated downward by an installation angle of the obstacle sensor 140.

The obstacle sensor 140 may irradiate light to an obstacle, and receive light reflected by the obstacle to calculate a distance to the obstacle. The obstacle sensor 140 may calculate a height of the obstacle using the calculated distance to the obstacle and the installation angle of the obstacle sensor 140.

As described above, the obstacle sensor 140 may calculate the height of the obstacle, or the controller 110 may calculate the height of the obstacle using information about the distance to the obstacle calculated by the obstacle sensor 140.

When light irradiated by the obstacle sensor 140 is reflected from the lower portion of an obstacle, it is impossible to calculate an accurate height of the obstacle. However, since the cleaning robot 100 travels to clean a floor, the cleaning robot 100 may approach an obstacle existing on a cleaning path. As the cleaning robot 100 approaches the obstacle, light irradiated by the obstacle sensor 140 may be reflected from the upper portion of the obstacle, and light finally reflected and received from the obstacle may be reflected from the uppermost portion of the obstacle.

Accordingly, the light finally reflected from the obstacle may be used to calculate a more accurate height of the obstacle. In FIG. 12, a distance between the obstacle sensor 140 and an obstacle O is shown as a distance between the obstacle sensor 140 and the uppermost portion of the obstacle O.

Since the obstacle sensor 140 is rotated by the rotation driver 143 to transmit and receive light when the cleaning robot 100 travels, a height of an obstacle located in front of the cleaning robot 100 may be sensed by any one of the above-described methods.

By adopting the obstacle sensor 140 that uses a laser source as a light source and that is rotatable, it is possible to acquire information about a distance to an obstacle, a direction in which the obstacle is located, and a height of the obstacle with high resolution without installing any additional sensor for sensing an obstacle.

The obstacle sensor 140 may acquire information about a location of an obstacle (that is, information about a distance between the cleaning robot 100 and the obstacle), and information about a direction in which the obstacle is located with respect to a traveling direction of the cleaning robot 100, in addition to the height of the obstacle, as described above. The obstacle sensor 140 may include a camera, as well as a rotatable optical module as described above. The controller 110 may create a 3D obstacle map using image information of an obstacle acquired by the camera.

The controller 110 may create a 3D obstacle map about an environment around the cleaning robot 100, as shown in FIG. 13, using location information and height information of obstacles. The 3D obstacle map may include height information of obstacles. That is, the 3D obstacle map may include x coordinates, y coordinates, and z coordinates. Also, the controller 110 may classify the obstacles into several types based on information about widths, heights, or distribution of the obstacles, and store the types of the obstacles in the 3D obstacle map, together with the location information of the obstacles.

For example, as shown in FIG. 13, an obstacle a having a low height and a wide width may be decided as a door sill, and an obstacle b having a high height and a narrow width may be decided as a thin obstacle such as a table leg. Also, two obstacles c spaced by the width of the cleaning robot 100 and having a high height and a wide width may be decided as a narrow area, and an obstacle d having a low height and a narrow width may be decided as an obstacle placed on a floor. Also, an obstacle e whose bottom is partially spaced from the floor to form space from the floor may be decided as an obstacle, such as a sofa or a bed.

The controller 110 may decide a driving method suitable for the obstacles using the 3D obstacle map. If a height of an obstacle is higher than or equal to a reference height decided based on a height of an obstacle over which the cleaning robot 100 can climb, the controller 110 may control the cleaning robot 100 to avoid the obstacle. If a height of an obstacle is lower than the reference height, the controller 110 may control the cleaning robot 100 to climb over the obstacle.

For example, if an obstacle is decided as the obstacle a such as a door sill having a low height and a narrow width, the controller 110 may control operation of the moving portion 160 so that the cleaning robot 100 can climb over the obstacle. If an obstacle is decided as the obstacle b such as a table leg having a high height, the controller 110 may plan a traveling path on which the cleaning robot 100 can avoid the obstacle, and control driving of the moving portion 160 based on the traveling path. Also, if an obstacle is decided as the obstacle e such as a sofa or a bed forming space from a floor, the controller 110 may determine whether the space between the obstacle e and the floor has a height that the cleaning robot 100 can pass. Also, the controller 110 may determine whether the cleaning robot 100 can enter below the obstacle, based on the height of the space. If the height of the space between the obstacle e and the floor is decided as the height that the cleaning robot 100 can pass, the controller 110 may control driving of the moving portion 160 so that the cleaning robot 100 can enter the space to clean the floor.

The controller 110 may create an obstacle map for an environment around the cleaning robot 100 using the result of sensing by the obstacle sensor 140, and create a feature point map consisting of feature points of space in which the cleaning robot 100 is located.

Figure 14:
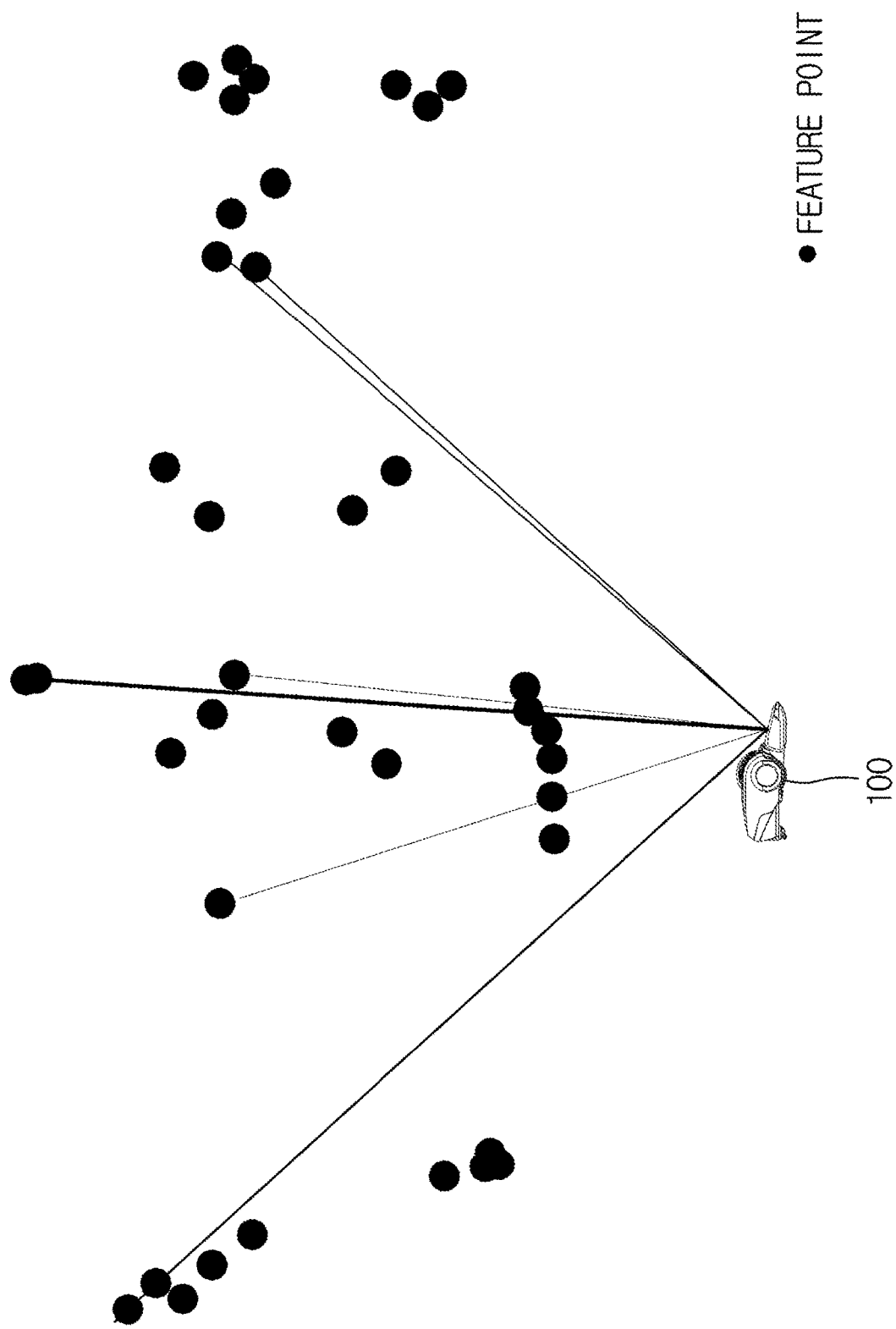
FIG. 14 conceptually shows a feature point map created by the cleaning robot according to an embodiment of the present disclosure.

FIG. 14 conceptually shows a feature point map created by the cleaning robot according to an embodiment of the present disclosure.

The image acquirer 150 may include a camera module 151 to acquire an upper view image of the cleaning robot 100. The camera module 151 may acquire an upper view image of the cleaning robot 100, and transfer the upper view image to the controller 110. The controller 110 may perform image processing on the upper view image received from the camera module 151 to extract feature points from the upper view image, and thus create a feature point map as shown in FIG. 14.

Feature points of an image may need to easily find the corresponding locations from the image even when a view point of a camera or illumination changes, and be easily identified even when the shape, size, or location of an object changes. For example, a corner point may correspond to a feature point satisfying the conditions. The controller 110 may extract feature points using various methods. For example, the controller 110 may extract feature points using a Harris corner method, a Shi-Tomasi method, a Scale Invariant Feature Transform-Difference of Gaussian (SIFT-DoG) method, a Feature from Accelerated Segment Test (FAST) method, etc.

The controller 110 may create a feature point map as shown in FIG. 14, localize the cleaning robot 100 using the feature point map and information acquired by the motion detector 130, and create an obstacle map using a location of the cleaning robot 100 and information acquired by the obstacle sensor 140.

The cleaning robot 100 according to the current embodiment may provide a method of efficiently performing cleaning using the feature point map. Hereinafter, the method will be described in detail with reference to FIGS. 15 and 16.

Figure 15:
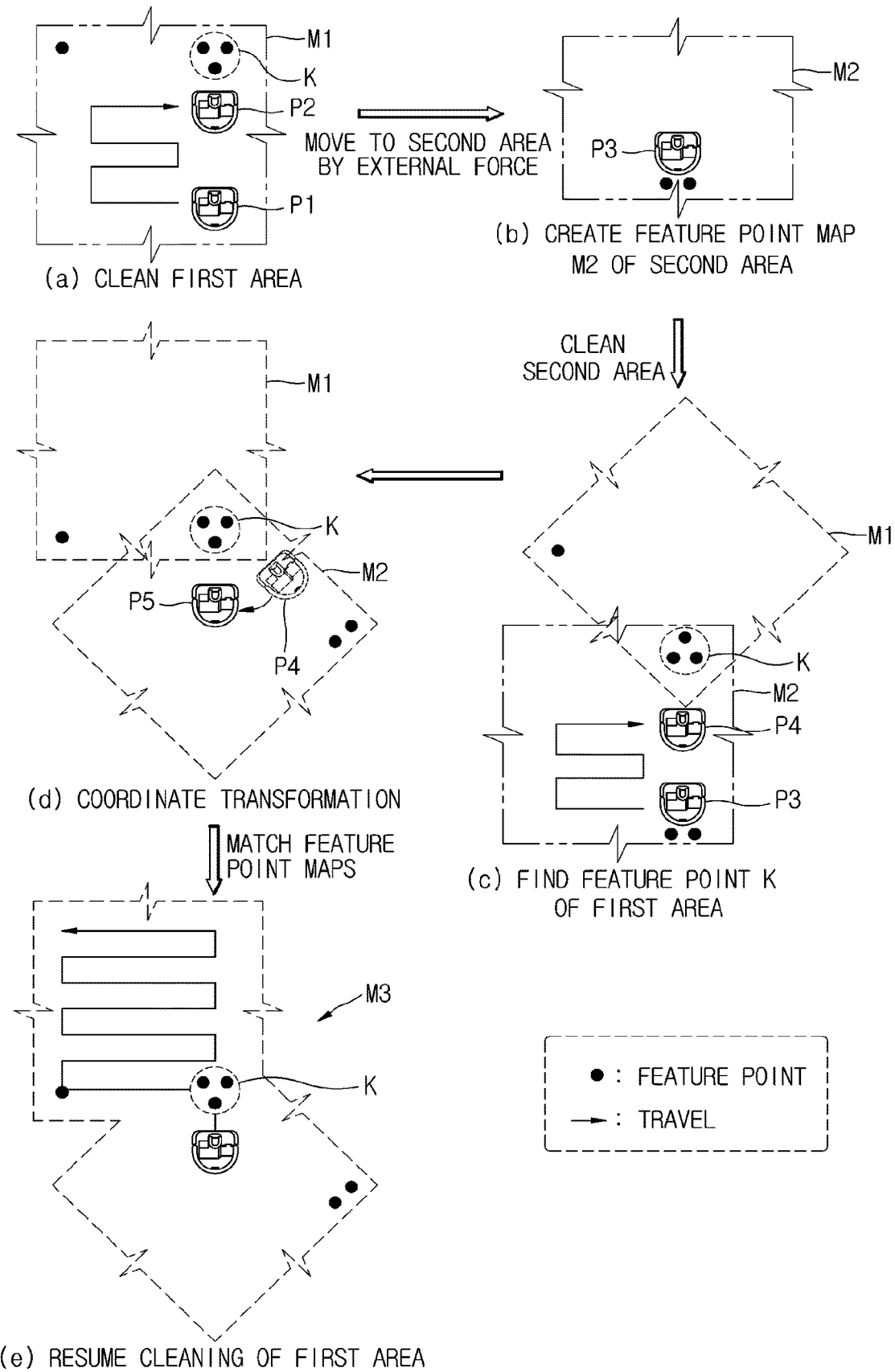
FIG. 15 is a view for describing an example of a method of merging feature point maps of different areas in the cleaning robot according to an embodiment of the present disclosure.

FIG. 15 is a view for describing an example of a method of merging feature point maps of different areas in the cleaning robot according to an embodiment of the present disclosure, and FIG. 16 is a view for describing an example of a method of merging obstacle maps of different areas in the cleaning robot according to an embodiment of the present disclosure.

The cleaning robot 100 may create a feature point map and an obstacle map of a first area which the cleaning robot 100 cleans currently, and clean the first area. In (a) of FIG. 15, a feature point map of the first area seen from above the cleaning robot 100 is shown.

As shown in (a) of FIG. 15, the cleaning robot 100 may clean the first area while traveling from a point P1 to a point P2 of the first area. For convenience of description, a traveling path of the cleaning robot 100 is shown as a linear path from the point P1 to the point P2, however, this is only an example. The point P1 at which the cleaning robot 100 starts traveling in the first area may be any point of the first area. Also, the point P2 may be any final location of the cleaning robot 100 in the first area just before the cleaning robot 100 moves to another area by an external force during cleaning.

If the cleaning robot 100 moves to a point P3 of a second area from the point P2 by an external force while cleaning the first area, the controller 110 may store the feature point map and the obstacle map of the first area in memory. A representative example in which the cleaning robot 100 moves by an external force may be a case in which a user moves the cleaning robot 100 to another area. The point P3 may be a point at which the cleaning robot 100 starts traveling in the second area, or a point of the second area at which the cleaning robot 100 is first located by an external force.

If the cleaning robot 100 moves to the second area by an external force, the controller 110 of the cleaning robot 100 may create a feature point map and an obstacle map for the second area using information acquired by the image acquirer 150 and the obstacle sensor 140 in order to clean the second area.

The first area and the second area may be areas spatially separated, such as different rooms, or different locations in the same space such as a living room. In the current embodiment, it is preferable to define the first area and the second area based on whether the cleaning robot 100 moves by an external force and whether a feature point map is created, rather than defining the first area and the second area according to spatial criteria. For example, the first area may be an area for which a feature point map has been created, and the second area may be an area to which the cleaning robot 100 moves by an external force and for which a feature point map has not yet been created. That is, an area to which the cleaning robot 100 moves by an external force may be the second area as long as a feature point map for the corresponding area has not yet been created, although the area belongs to the same space.

If the feature point map and the obstacle map for the second area are created, the controller 110 may clean the second area using the feature point map and the obstacle map.

The cleaning robot 100 may detect a feature point k existing on the feature point map of the first area from the feature point map of the second area, while cleaning the second area. For example, when the cleaning robot 100 cleans the second area completely and then again enters the first area, the cleaning robot 100 may detect a feature point k (hereinafter, referred to as a reference feature point) of the feature point map of the second area from the feature point map of the first area.

When the cleaning robot 100 enters the first area, the first area may be in a state in which it is not completely cleaned since the cleaning robot 100 has moved to the second area while cleaning the first area. In this case, the cleaning robot 100 according to the current embodiment may clean the remaining space of the first area except for space already cleaned in the first area, without again cleaning the space already cleaned, thereby performing cleaning more efficiently.

For the operation, the controller 110 of the cleaning robot 100 according to the current embodiment may merge, when a reference feature point k of the feature point map of the second area is detected from the feature point map of the first area, the feature point map of the first area with the feature point map of the second area using the detected reference feature point k. Also, the controller 110 may clean the first area from a point at which cleaning has stopped due to a movement of the cleaning robot 100 by an external force, using the feature point map.

As shown in (c) of FIG. 15, if a reference feature point of the first area is detected from the feature point map of the second area, the controller 110 may perform coordinate transformation on the feature point map of the second area in order to match the feature point map of the second area with the feature point map of the first area so that coordinates of the detected reference feature point of the second area are identical to coordinates of the corresponding reference feature point of the first area. Hereinafter, an example of coordinate transformation will be described in more detail.

If a reference feature point of the first area is detected at a point P4 of the second area, the controller 110 may detect location coordinates of the cleaning robot 100 at the point P4, and location coordinates of the cleaning robot 100 stored in correspondence to the reference feature point in the feature point map of the first area. If the current location coordinates of the cleaning robot 100 at the point P4 are identical to the location coordinates of the cleaning robot 100 stored in correspondence to the reference feature point in the feature point map of the first area, the controller 110 may immediately match the feature point map of the second area with the feature point map of the first area. If the current location coordinates of the cleaning robot 100 at the point P4 are not identical to the location coordinates of the cleaning robot 100 stored in correspondence to the reference feature point in the feature point map of the first area, the controller 110 may transform coordinates of the feature point map of the second area so that the current location coordinates of the cleaning robot 100 at the point P4 are identical to the location coordinates of the cleaning robot 100 stored in the feature point map of the first area. During the coordinate transformation, the location of the cleaning robot 100 may move to a point P5 from the point P4, as shown in (d) of FIG. 15. The point P5 may be a point corresponding to the location coordinates of the cleaning robot 100 stored in correspondence to the reference feature point in the feature point map of the first area.

If the coordinate transformation on the feature point map of the second area is completed through the above-described process, the controller 110 may match the feature point map of the second area with the feature point map of the first area using the reference feature point, as shown in (e) of FIG. 15.

Also, the controller 110 may perform coordinate transformation on the obstacle map of the second area, like the coordinate transformation on the feature point map of the second area, in order to match the obstacle map of the second area with the obstacle map of the first area, as shown in FIG. 16. The controller 110 may match the obstacle map of the second area on which coordinate transformation has been performed with the obstacle map of the first area to create an obstacle map for the first area and the second area, and resume cleaning of the first area using the created obstacle map and the feature point map M3, as shown in (e) of FIG. 15.

Figure 17:
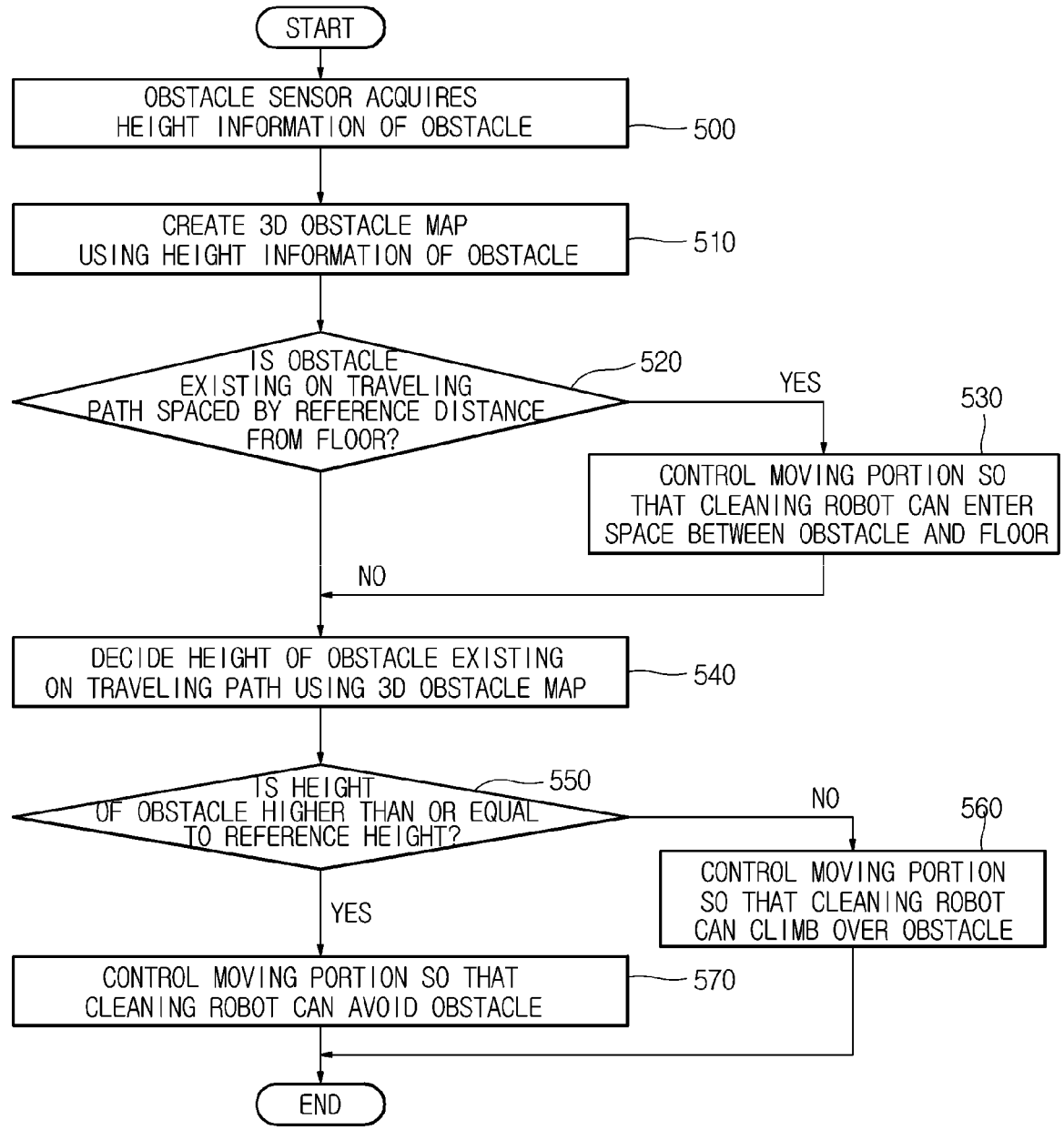
FIG. 17 is a flowchart illustrating a method of creating a 3D obstacle map in the cleaning robot according to an embodiment of the present disclosure.

FIG. 17 is a flowchart illustrating a method of creating a 3D obstacle map in the cleaning robot according to an embodiment of the present disclosure. Hereinafter, a method of creating a 3D obstacle map in the cleaning robot 100 according to an embodiment of the present disclosure will be described with respect to FIG. 17.

Referring to FIG. 17, the obstacle sensor 140 of the cleaning robot 100 may acquire height information of an obstacle, in operation 500, and the controller 110 may create a 3D obstacle map using the height information of the obstacle, in operation 510.

As shown in FIG. 12, the obstacle sensor 140 may be tilted downward at a predetermined angle θ with respect to the front direction so that light irradiated from the obstacle sensor 140 can proceed downward. Accordingly, light generated by the obstacle sensor 140 may be irradiated downward at the installation angle θ of the obstacle sensor 140.

The obstacle sensor 140 may irradiate light to an obstacle, and receive light reflected by the obstacle to sense a distance to the obstacle. The obstacle sensor 140 may calculate a height of the obstacle using the distance to the obstacle and the installation angle θ of the obstacle sensor 140.

When light irradiated by the obstacle sensor 140 is reflected from the lower portion of an obstacle, it is impossible to calculate an accurate height of the obstacle. However, since the cleaning robot 100 travels to clean a floor, the cleaning robot 100 may approach an obstacle existing on a cleaning path. As the cleaning robot 100 approaches the obstacle, light irradiated by the obstacle sensor 140 may be reflected from the upper portion of the obstacle, and light finally reflected and received from the obstacle may be light reflected from the uppermost portion of the obstacle. Accordingly, the light finally reflected from the obstacle may be used to calculate a more accurate height of the obstacle. The obstacle sensor 140 may acquire a height of an obstacle, location information of the obstacle (that is, information about a distance between the cleaning robot 100 and the obstacle), and direction information of the obstacle with respect to the traveling direction of the cleaning robot 100, as described above.

The controller 110 may create a 3D obstacle map for an environment around the cleaning robot 100, as shown in FIG. 13, using location information and height information of obstacles. The 3D obstacle map may include the height information of obstacles. Also, the controller 110 may classify the obstacles into several types based on information about widths, heights, or distribution of the obstacles, and store the types of the obstacles in the 3D obstacle map, together with the location information of the obstacles. For example, as shown in FIG. 13, an obstacle a having a low height and a wide width may be decided as a door sill, and an obstacle b having a high height and a narrow width may be decided as a thin obstacle such as a table leg. Also, two obstacles c spaced by the width of the cleaning robot 100 and having a high height and a wide width may be decided as a narrow area, and an obstacle d having a low height and a narrow width may be decided as an obstacle placed on a floor. Also, an obstacle e whose bottom is partially spaced from the floor to form space from the floor may be decided as an obstacle, such as a sofa or a bed.

If the 3D obstacle map is created, the controller 110 may determine whether the obstacle existing on the traveling path is spaced by a reference distance from the floor, using the 3D obstacle map, in operation 520, and if the obstacle is spaced by the reference distance from the floor, the controller 110 may control the moving portion 160 so that the cleaning robot 100 can enter space between the obstacle and the floor, in operation 530.

Also, if the obstacle is decided as the obstacle e such as a sofa or a bed forming space from a floor, the controller 110 may determine whether the space between the obstacle e and the floor corresponds to the reference distance of a height that the cleaning robot 100 can pass.

If the obstacle is spaced by the reference distance from the floor, the controller 110 may control driving of the moving portion 160 so that the cleaning robot 100 can enter the space to clean the floor.

Also, if the 3D obstacle map is created, the controller 110 may decide a height of an obstacle existing on the traveling path of the cleaning robot 100 using the 3D obstacle map, in operation 540, and determine whether the decided height of the obstacle is higher than or equal to a reference height, in operation 550. If the height of the obstacle is higher than or equal to the reference height, the controller 110 may control driving of the moving portion 160 so that the cleaning robot 100 can avoid the obstacle, in operation 570, and if the height of the obstacle is lower than the reference height, the controller 110 may control driving of the moving portion 160 so that the cleaning robot 100 can climb over the obstacle, in operation 560.

The controller 110 may decide a driving method suitable for the obstacle, using the 3D obstacle map. If the height of the obstacle is higher than or equal to a reference height decided based on a height of an obstacle over which the cleaning robot 100 can climb, the controller 110 may control the cleaning robot 100 to avoid the obstacle. If the height of the obstacle is lower than the reference height, the controller 110 may control the cleaning robot 100 to climb over the obstacle.

For example, if the obstacle is decided as an obstacle such as a door sill having a low height and a narrow width, the controller 110 may control operation of the moving portion 160 so that the cleaning robot 100 can climb over the obstacle.

If the obstacle is decided as the obstacle b such as a table leg having a high height, the controller 110 may plan a traveling path on which the cleaning robot 100 can avoid the obstacle, and control driving of the moving portion 160 based on the traveling path.

The cleaning robot 100 according to the current embodiment may use the 3D obstacle map including the height information of the obstacle to set a traveling path suitable for a shape or type of the obstacle, thereby performing cleaning efficiently.

Figure 18:
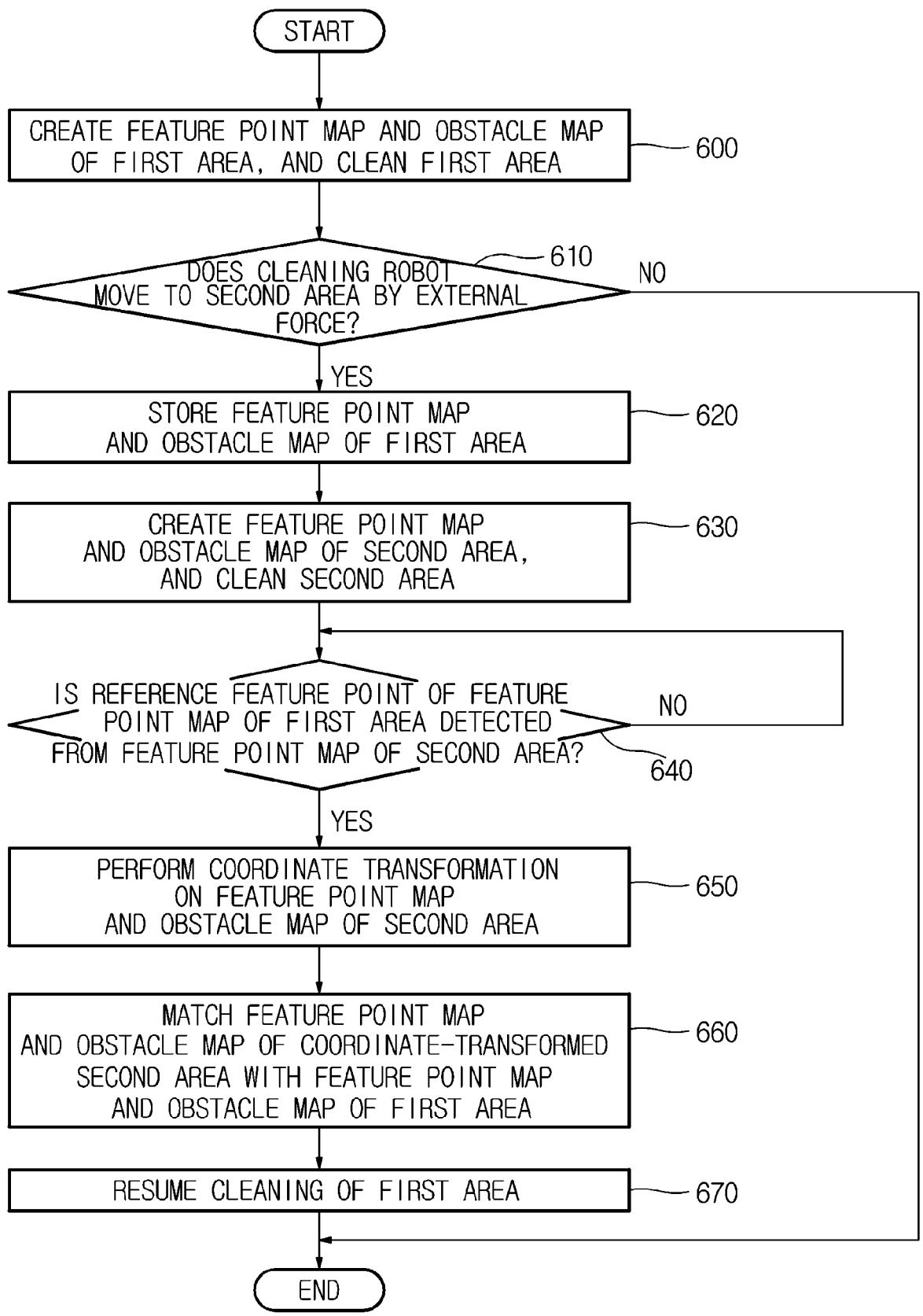
FIG. 18 is a flowchart illustrating a method of matching feature point maps in the cleaning robot according to an embodiment of the present disclosure.

FIG. 18 is a flowchart illustrating a method of matching feature point maps in the cleaning robot according to an embodiment of the present disclosure.

Hereinafter, a method of matching feature point maps in the cleaning robot 100 according to an embodiment of the present disclosure will be described with reference to FIG. 18.

Referring to FIG. 18, the controller 110 of the cleaning robot 100 may create a feature point map and an obstacle map of a first area, and clean the first area using the feature point map and the obstacle map, in operation 600.

The controller 110 may perform image processing on an upper view image of the first area, received from the camera module 151 of the image acquirer 150, and extract a feature point from the upper view image to create a feature point map as shown in FIG. 12.

The controller 110 may localize the cleaning robot 100 using the feature point map and information acquired by the motion detector 130, and create an obstacle map using the location of the cleaning robot 100 and the information acquired by the obstacle sensor 140.

The cleaning robot 100 may create a feature point map and an obstacle map of the first area which the cleaning robot 100 cleans currently, to clean the first area. In (a) of FIG. 15, a feature point map of the first area seen from above the cleaning robot 100 is shown.

As shown in (a) of FIG. 15, the cleaning robot 100 may clean the first area while traveling from a point P1 to a point P2 of the first area. For convenience of description, a traveling path of the cleaning robot 100 is shown as a linear path from the point P1 to the point P2, however, this is only an example. The point P1 at which the cleaning robot 100 starts traveling in the first area may be any point of the first area. Also, the point P2 may be any final location of the cleaning robot 100 in the first area just before the cleaning robot 100 moves to another area by an external force during cleaning.

If the cleaning robot 100 moves to the second area by an external force during cleaning, in operation 610, the controller 110 may store the feature point map and the obstacle map of the first area, in operation 620. Then, the controller 110 may create a feature point map and an obstacle map of the second area, and clean the second area using the feature point map and the obstacle map of the second area, in operation 630.

If the cleaning robot 100 moves to a point P3 of the second area from the point P2 by an external force while cleaning the first area, the controller 110 may store the feature point map and the obstacle map of the first area in memory. Then, the controller 110 of the cleaning robot 100 may create a feature point map and an obstacle map of the second area using information acquired by the image acquirer 150 and the obstacle sensor 140, in order to clean the second area.

The first area and the second area may be areas spatially separated, such as different rooms, or different locations in the same space such as a living room. In the current embodiment, it is preferable to define the first area and the second area based on whether the cleaning robot 100 moves by an external force and whether a feature point map is created, rather than defining the first area and the second area according to spatial criteria. For example, the first area may be an area for which a feature point map has been created, and the second area may be an area to which the cleaning robot 100 moves by an external force and for which a feature point map has not yet been created. That is, an area to which the cleaning robot 100 moves by an external force may be the second area as long as a feature point map for the corresponding area has not yet been created, although the area belongs to the same space.

If the feature point map and the obstacle map of the second area are created, the controller 110 may clean the second area using the feature point map and the obstacle map.

If the controller 110 detects a reference feature point of the feature point map of the first area from the feature point map of the second area while cleaning the second area, in operation 640, the controller 110 may perform coordinate transformation on the feature point map and the obstacle map of the second area, in operation 650, and match the feature point map and the obstacle map of the second area on which the coordinate transformation has been performed with the feature point map and the obstacle map of the first area, in operation 660. The controller 110 may resume cleaning of the first area using the matched feature point map and the matched obstacle map, in operation 670.

When the cleaning robot 100 cleans the second area, the cleaning robot 100 may detect a reference feature point existing on the feature point map of the first area from the feature point map of the second area. For example, when the cleaning robot 100 cleans the second area completely and then again enters the first area, the cleaning robot 100 may detect a reference feature point of the feature point map of the second area from the feature point map of the first area.

When the cleaning robot 100 enters the first area, the first area may be in a state in which it is not completely cleaned since the cleaning robot 100 has moved to the second area when cleaning the first area. In this case, the cleaning robot 100 according to the current embodiment may clean the remaining space of the first area except for space already cleaned in the first area, without again cleaning the space already cleaned, thereby performing cleaning more efficiently.

For this, if the controller 110 of the cleaning robot 100 according to an embodiment of the present disclosure detects a reference feature point k of the feature point map of the second area from the feature point map of the first area, the controller 110 may match the feature point map of the first area with the feature point map of the second area using the detected reference feature point k. Also, the controller 110 may clean the first area starting from a point at which cleaning has stopped due to the movement of the cleaning robot 100 by the external force, using the matched feature point map.

As shown in (c) of FIG. 15, if the reference feature point of the first area is detected from the feature point map of the second area, the controller 110 may perform coordinate transformation on the feature point map of the second area, in order to match the feature point map of the second area with the feature point map of the first area using the detected reference feature point.

If a reference feature point of the first area is detected at a point P4 of the second area, the controller 110 may detect current location coordinates of the cleaning robot 100 at the point P4, and location coordinates of the cleaning robot 100 stored in correspondence to the reference feature point in the feature point map of the first area.

If the current location coordinates of the cleaning robot 100 at the point P4 are identical to the location coordinates of the cleaning robot 100 stored in correspondence to the reference feature point in the feature point map of the first area, the controller 110 may immediately match the feature point map of the second area with the feature point map of the first area.

If the current location coordinates of the cleaning robot 100 at the point P4 are not identical to the location coordinates of the cleaning robot 100 stored in correspondence to the reference feature point in the feature point map of the first area, the controller 110 may transform coordinates of the feature point map of the second area so that the current location coordinates of the cleaning robot 100 at the point P4 are identical to the location coordinates of the cleaning robot 100 stored in the feature point map of the first area.

During the coordinate transformation, the location of the cleaning robot 100 may move to a point P5 from the point P4, as shown in (d) of FIG. 15. The point P5 may be a point corresponding to the location coordinates of the cleaning robot 100 stored in correspondence to the reference feature point in the feature point map of the first area.

If the coordinate transformation on the feature point map of the second area is completed through the above-described process, the controller 110 may match the feature point map of the second area with the feature point map of the first area using the reference feature point, as shown in (e) of FIG. 15.

Also, the controller 110 may perform coordinate transformation on the obstacle map of the second area, like the coordinate transformation on the feature point map of the second area, in order to match the obstacle map of the second area with the obstacle map of the first area, as shown in FIG. 16. The controller 110 may match the obstacle map of the second area on which the coordinate transformation has been performed with the obstacle map of the first area to create an obstacle map for the first area and the second area, and resume cleaning of the first area using the created obstacle map and the feature point map M3, as shown in (e) of FIG. 15.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A cleaning robot comprising:
    a main body;
    a moving portion to move the main body;
    an obstacle sensor to sense a height of an obstacle in one or more areas;
    a camera mounted on an upper portion of the main body, and configured to acquire an upper view image of the cleaning robot; and
    a controller configured to:
        store an obstacle map of a first area including information about the height of the obstacle, based on the sensed height of the obstacle,
        store a feature point map of the first area by extracting a feature point from the upper view image acquired by the camera,
        when the cleaning robot is moved from the first area to a second area by an external force, store the obstacle map of the second area and the feature point map of the second area, and
        when the cleaning robot reenters the first area, control the moving portion to move the main body to clean from a point where the cleaning is stopped in the first area, based on the obstacle map of the first area, the obstacle map of the second area, the feature point map of the first area and the feature point map of the second area.

2. The cleaning robot according to claim 1, wherein the controller is further configured to:
    determine whether the height of the obstacle existing on the obstacle map is higher than or equal to a predetermined height; and
    control the moving portion so that the main body avoids the obstacle, based on the determination by the controller that the height of the obstacle is higher than or equal to the predetermined height.

3. The cleaning robot according to claim 2, wherein the controller is further configured to:

control the moving portion to climb over the obstacle, based on the determination by the controller that the height of the obstacle is lower than the predetermined height.

4. The cleaning robot according to claim 1,
wherein the obstacle map comprises at least one of a two-dimensional (2D) obstacle map or the information about the height of the obstacle, and
wherein the obstacle map comprises at least one of shape information or type information of the obstacle.

5. The cleaning robot according to claim 1, wherein the obstacle sensor is further configured to irradiate light downward at a predetermined angle with respect to a front direction.

6. The cleaning robot according to claim 1, wherein the obstacle sensor is further configured to be tilted downward at a predetermined angle with respect to a front direction.

7. The cleaning robot according to claim 1, wherein the obstacle sensor comprises:
an optical module to transmit and receive light; and
a rotary driver to rotate the optical module.

8. The cleaning robot according to claim 7, wherein the optical module comprises:
a light emitting portion to transmit light; and
a light receiving portion to receive light incident from outside of the cleaning robot.

9. The cleaning robot according to claim 8, wherein the light emitting portion includes a laser source, and the light receiving portion includes an image sensor.

10. The cleaning robot according to claim 1, wherein the controller is further configured to match the feature point map of the first area with the feature point map of the second area, based on the cleaning robot moving from the first area to the second area by the external force.

11. The cleaning robot according to claim 1, wherein the controller is further configured to match the obstacle map of the first area with the obstacle map of the second area, based on the cleaning robot moving from the first area to the second area by the external force.

12. The cleaning robot according to claim 10, wherein the controller is further configured to:
detect a feature point included in the feature point map of the first area from the feature point map of the second area; and
match the feature point map of the first area with the feature point map of the second area using the detected feature point.

13. The cleaning robot according to claim 12, wherein the controller is further configured to perform coordinate transformation on the feature point map of the second area such that coordinates of the detected feature point are identical to coordinates of the corresponding feature point in the feature point map of the first area, to thereby match the feature point map of the second area with the feature point map of the first area.

14. The cleaning robot according to claim 13, wherein the controller is further configured to perform coordinate transformation on an obstacle map of the second area to match the obstacle map of the second area with an obstacle map of the first area.

15. A method of controlling a cleaning robot, comprising:
sensing, by an obstacle sensor of the cleaning robot, a height of an obstacle in one or more areas;
acquiring, by a camera, an upper view image of the cleaning robot;
storing, by a controller of the cleaning robot, an obstacle map of a first area including information about the height of the obstacle, based on the sensed height of the obstacle;
storing, by the controller, a feature point map of the first area by extracting a feature point from the upper view image acquired by the camera;
when the cleaning robot is moved from the first area to a second area by an external force, storing the obstacle map of the second area and the feature point map of the second area; and
when the cleaning robot reenters the first area, controlling, by the controller, a moving portion to move the main body to clean from a point where the cleaning is stopped in the first area, based on the obstacle map of the first area, the obstacle map of the second area, the feature point map of the first area and the feature point map of the second area.

16. The method according to claim 15, further comprising:
determining, by the controller, whether the height of the obstacle existing on the obstacle map is higher than or equal to a predetermined height; and
moving, at the moving portion of the cleaning robot, the cleaning robot such that the cleaning robot avoids the obstacle, based on the determination that the height of the obstacle is higher than or equal to the predetermined height.

17. The method according to claim 16, further comprising:
moving, at the moving portion of the cleaning robot, the cleaning robot such that the cleaning robot climbs over the obstacle, based on the height of the obstacle being lower than the predetermined height.

18. The method according to claim 15, wherein, based on the cleaning robot moving from the first area to the second area by the external force, the method further comprises:
detecting the feature point included in the feature point map of the first area from the feature point map of the second area;
performing coordinate transformation on the feature point map of the second area such that coordinates of the detected feature point are identical to coordinates of the corresponding feature point in the feature point map of the first area;
matching the feature point map of the second area on which the coordinate transformation has been performed with the feature point map of the first area;
performing the coordinate transformation on an obstacle map of the second area; and
matching the obstacle map of the second area on which the coordinate transformation has been performed, with an obstacle map of the first area.

19. The method according to claim 18, further comprising:
cleaning the remaining space of the first area except for space cleaned in the first area using the matched feature point map, based on the cleaning robot entering the first area.

\* \* \* \* \*